United States Patent
Kong et al.

(10) Patent No.: US 7,943,898 B2
(45) Date of Patent: May 17, 2011

(54) PROJECTOR APPARATUS INCLUDING A LOWER HOLDER HAVING LENS AND LAMP FIXING SLOTS

(75) Inventors: Xiangfen Kong, Shenzhen (CN); Xianglin Zhang, Shenzhen (CN); Shoji Okazaki, Osaka (JP); Yanshan Huang, Shenzhen (CN); Tadashi Renbutsu, Hyogo (JP); Toshihiro Saruwatari, Osaka (JP); Wentian Tang, Shenzhen (CN); Qiang Lv, Shenzhen (CN)

(73) Assignees: Sanyo Electric Co., Ltd., Moriguchi (JP); Sanyo Technology Center (Shenzhen) Co., Ltd., Shenzhen (CN)

( * ) Notice: Subject to any disclaimer, the term of this patent is extended or adjusted under 35 U.S.C. 154(b) by 584 days.

(21) Appl. No.: 11/850,320

(22) Filed: Sep. 5, 2007

(65) Prior Publication Data
US 2008/0055570 A1   Mar. 6, 2008

(30) Foreign Application Priority Data
Sep. 5, 2006   (CN) .......................... 2006 1 0151694

(51) Int. Cl.
*H01J 5/02* (2006.01)
(52) U.S. Cl. .................. 250/239; 250/208.1
(58) Field of Classification Search .................. 250/239, 250/208.1; 353/119, 87, 101, 79; 362/551, 362/368, 430, 255, 256, 16
See application file for complete search history.

(56) References Cited

U.S. PATENT DOCUMENTS
| | | | |
|---|---|---|---|
| 3,632,198 A * | 1/1972 | Puffer | 353/60 |
| 6,398,367 B1 | 6/2002 | Watanabe | |
| 7,104,654 B2 * | 9/2006 | Tamaru et al. | 353/85 |

FOREIGN PATENT DOCUMENTS
CN   1532569 A   9/2004

OTHER PUBLICATIONS

Chinese Office Action dated Jul. 31, 2009, issued in Corresponding Chinese Patent Application No. 200610151694.

* cited by examiner

*Primary Examiner* — Que T Le
(74) *Attorney, Agent, or Firm* — Westerman, Hattori, Daniels & Adrian, LLP

(57) ABSTRACT

A projector apparatus and a lamp fixation structure for use with the projector apparatus are disclosed. The lamp fixation structure has a lower holder, which includes an integrally formed lower holder lens section and a lower holder lamp section. The lower holder lens section defines a lens fitting slot for fixing a lens, and a lower holder lamp section defines a lamp fitting slot for fixing a lamp. The lens fixing slot includes an upper holder connected to the lower holder. The lamp fixation structure also includes an integrally formed metal holder, which has an elastic top plate, elastic lateral plates, a front plate, an elastic bottom plate, and elastic jointing plates. The inventive lamp fixation structure of the projector apparatus consists of a fewer components and can be assembled in a simple manner, yet it is highly wrought.

7 Claims, 35 Drawing Sheets

PROJECTOR APPARATUS INCLUDING A LOWER HOLDER HAVING LENS AND LAMP FIXING SLOTS

FIELD OF THE INVENTION

This invention relates to a projector apparatus for constructing imaging light to be projected onto a front screen by leading a beam of light from a light source to an optical system, and more particularly to a projector apparatus equipped with an improved lamp fixation structure.

BACKGROUND OF THE INVENTION

The lamp of a projector apparatus serving as a light source belongs to consumable parts, so that the lamp and the lens of the optical system arranged close to the lamp are integrally designed to be independent from other parts for ease of replacement. In a typical conventional projector apparatus, the lamp is fixed with one or more plastic frames in multiple metal holders. It is often the case in conventional art that the lamp and the lens arranged closest to the lamp are mostly fixed separately. Since this type of fixation structure disadvantageously involves many parts and many assembling processes, assembling and disassembling of the lamp and/or lens is not easy.

In addition, in the projector apparatus, ventilation apparatuses, i.e. a fan and a duct, are provided near the light source to effect dissipation of heat from the parts in the vicinity of the lamp. Regarding the design of a lamp fixation structure for use with a projector apparatus, it is necessary to prevent the loss of light and heat radiation due to undesirable leak of light from the lamp unit. It is also necessary to prevent inadvertent influence of the lamp to the normal operation of the surrounding fan, power supply unit for example.

Therefore, there is a need of an improved lamp fixation structure, for use with a projector apparatus, which can be constituted of a fewer parts, fabricated and assembled in a simpler way, well ventilated, and well shielded against light and heat arising from the lamp light.

SUMMARY OF THE INVENTION

In view of the problems as stated above, it is an object of the present invention to provide a projector apparatus equipped with an improved lamp fixation structure.

The lamp fixation structure of the invention includes a lower holder, an upper holder, and a metal holder. The lower holder has an opening in the front end thereof and a lower holder lens section defining a lens fixing slot for firmly fixing a lens. The lower holder also has a lower holder lamp section defining a lamp fitting slot for fixing a lamp. The upper holder is connected to the lower holder. The metal holder is used to fix the lens and the lamp. The metal holder is integrally formed. The lower holder lamp section may be formed integral with the lower holder lens section.

The metal holder of the invention may have an elastic top plate, elastic lateral plates, a front plate, an elastic bottom plate, and elastic joint plates.

The lower holder lamp section may be provided with openings in the opposite side walls thereof.

Each of the elastic top plate and elastic lateral plates may have at least one opening.

The metal holder may be made of steel.

Each of the elastic lateral plates of the metal holder may have multiple venting holes.

The lower holder lamp section and the lower holder lens section may be integrally formed by molding a polymer material.

DETAILED DESCRIPTION OF THE PREFERRED EMBODIMENT

The invention will now be described in detail by way of example, particularly an LC projector apparatus and related parts, with reference to the accompanying drawings. In what follows, the "front" side of the projector apparatus refers to the side thereof having its projection lens (FIG. 1), and the "right" and "left" of the LC projector apparatus refer to the directions to the "right" and "left" relative to the front side, respectively. It should be understood that terms indicating relative positions of elements such as "bottom", "side", "oblique", and "directly below" are illustrative, and that the relative positions can be conveniently altered as needed.

Overall Arrangement

Figure 1:
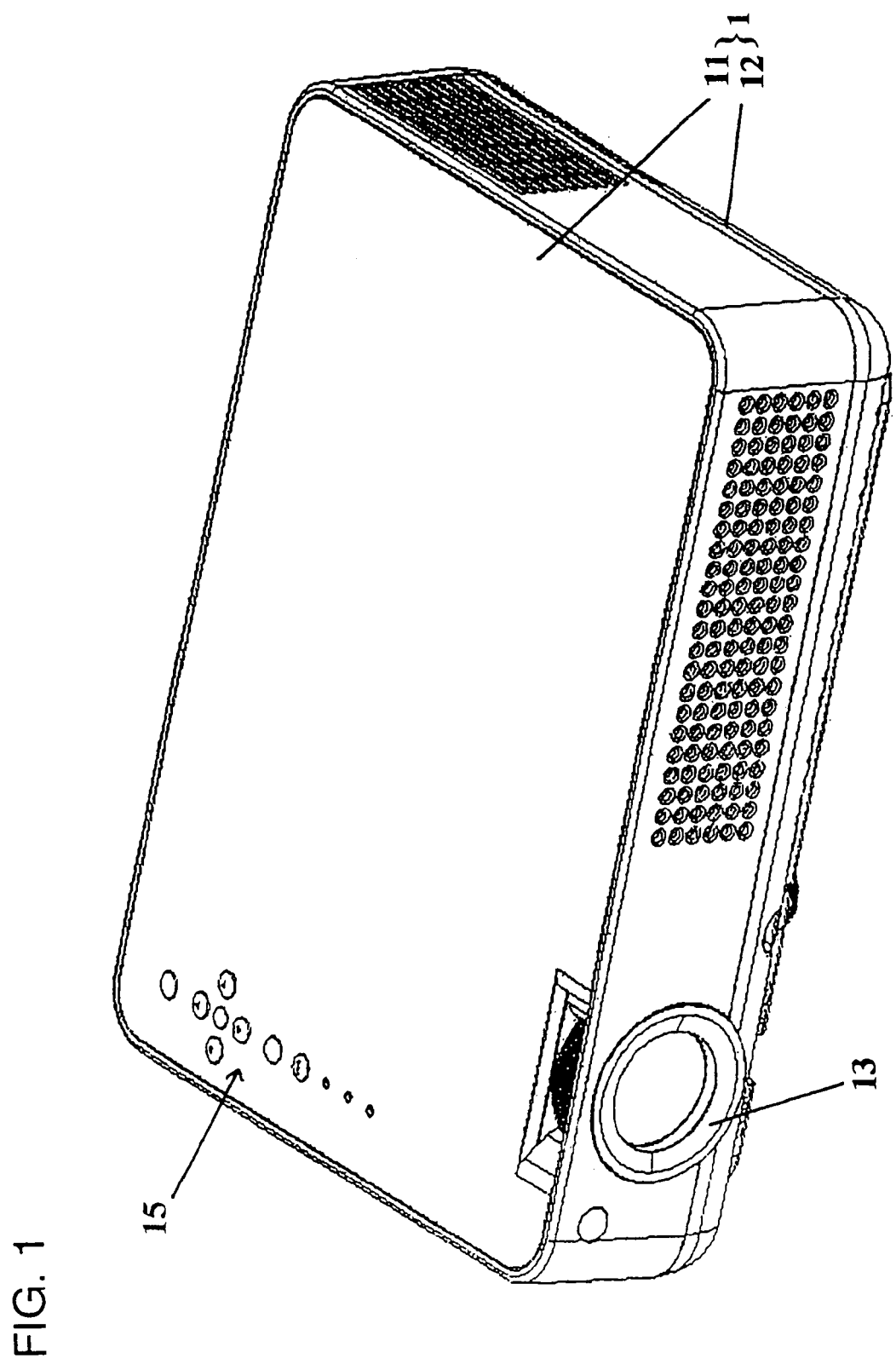
FIG. 1 is a perspective view of an LC (liquid crystal) projector apparatus in accordance with the present invention.

The LC projector apparatus is provided with a generally flat casing 1 which consists of an upper half section 11 and a lower half section 12, as shown in FIG. 1. Provided on the upper end of the casing 1 is a controller 15 having a multiplicity of buttons for manual operation of the projector apparatus. Formed in the front end is a projection window 13. Provided on the rear end of the casing 1 are exhausts, a power supply socket, and signal I/O device (not shown).

Figure 35:
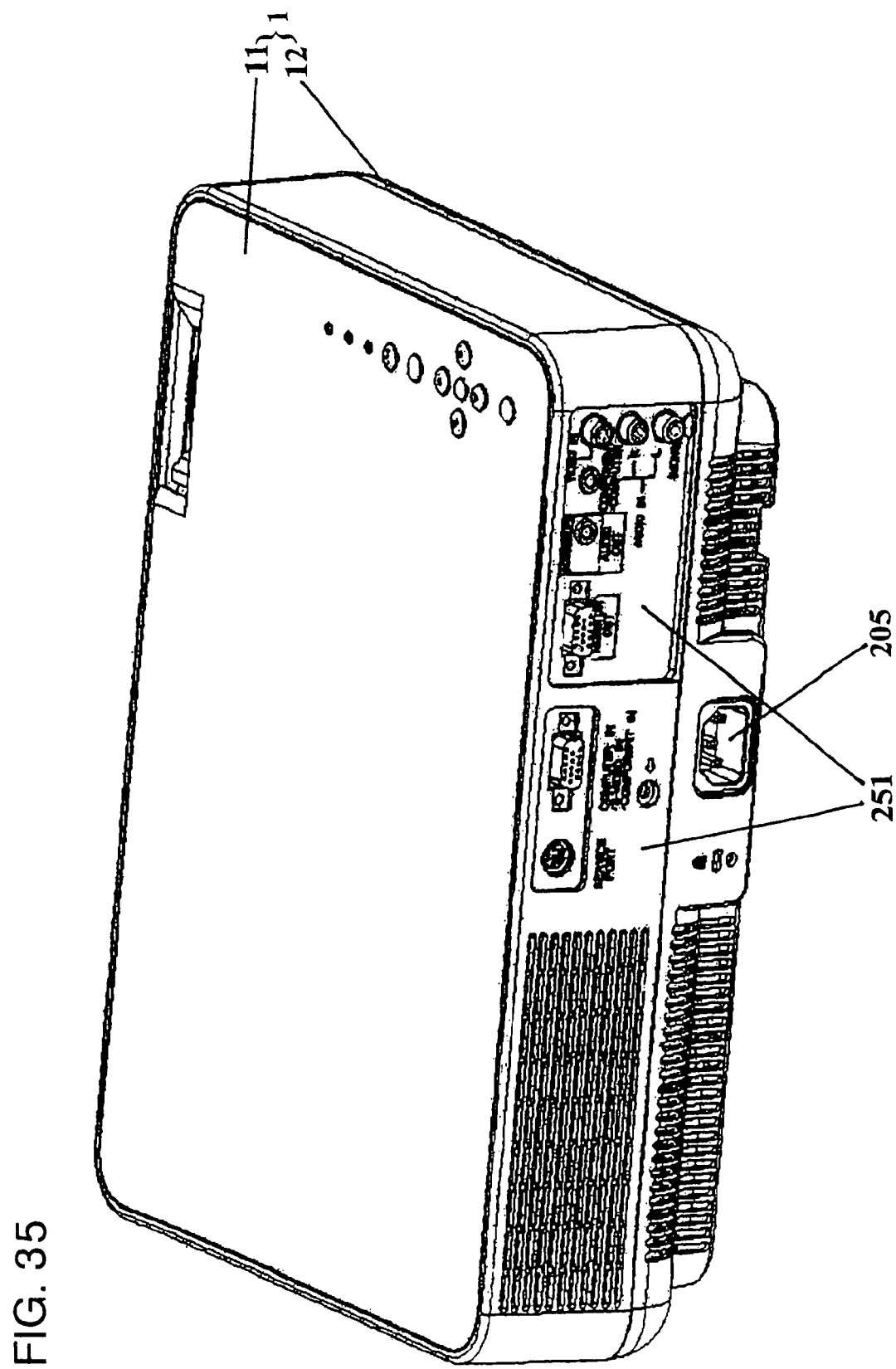
FIG. 35 is a perspective view of the LC projector apparatus as viewed backward.

FIG. 35 is a perspective view of the LC projector apparatus as viewed backward, showing a compound unit 251 provided on the rear end, which includes a D-SUB terminal to be connected with a computer and various external input terminals. Input terminals of the unit 251 can be molded. Each of them can be easily identified by the name, e.g. "AUDIO", of the terminal engraved on the surface of the terminal. Thus, it is not necessary to print characters on the exterior of the casing, which enhances manufacturing efficiency and lowers the cost of the projector apparatus.

Figure 2:
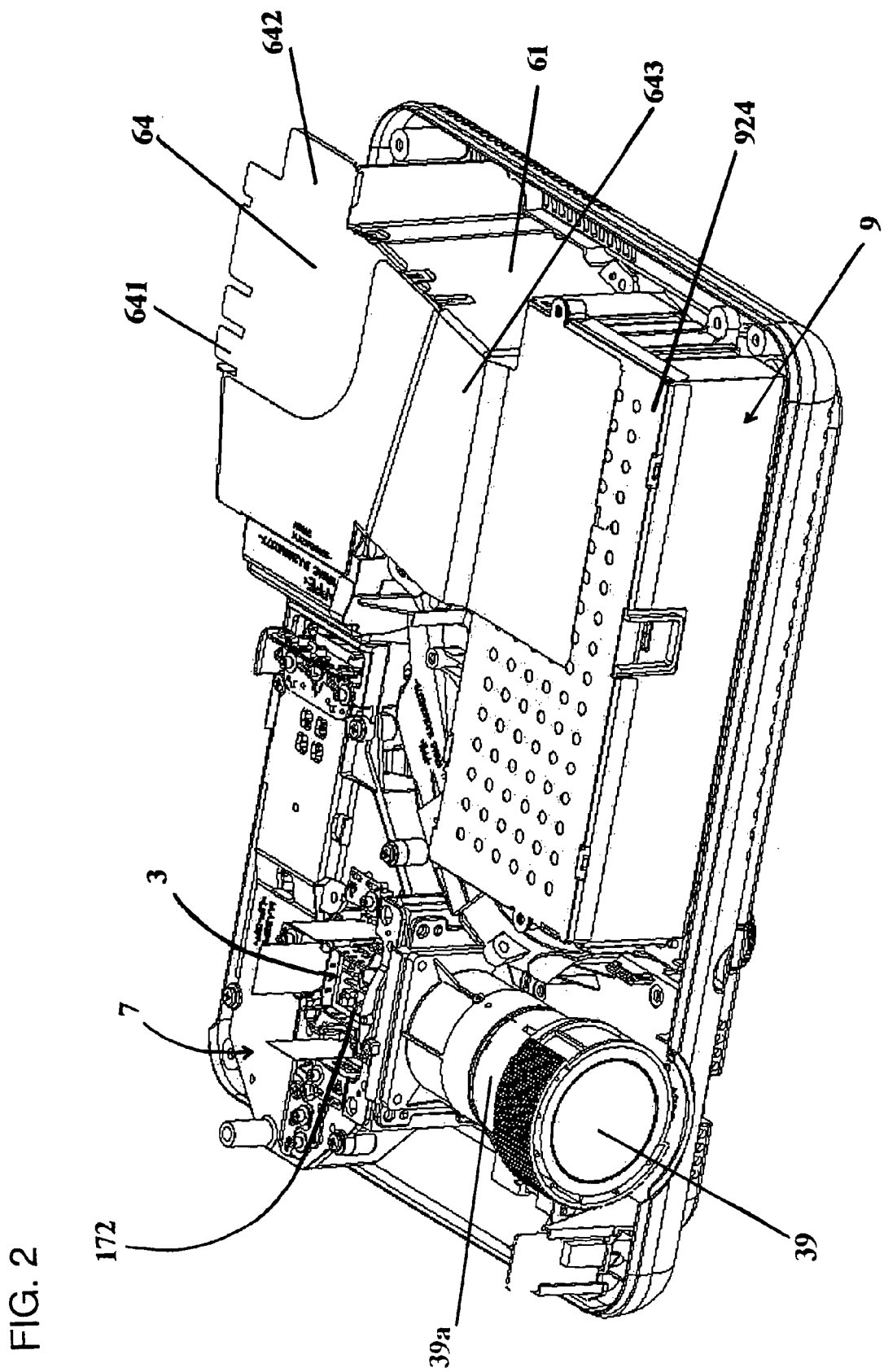
FIG. 2 is a perspective view of the LC projector apparatus shown in FIG. 1, with the upper half section of its casing removed.
Figure 3:
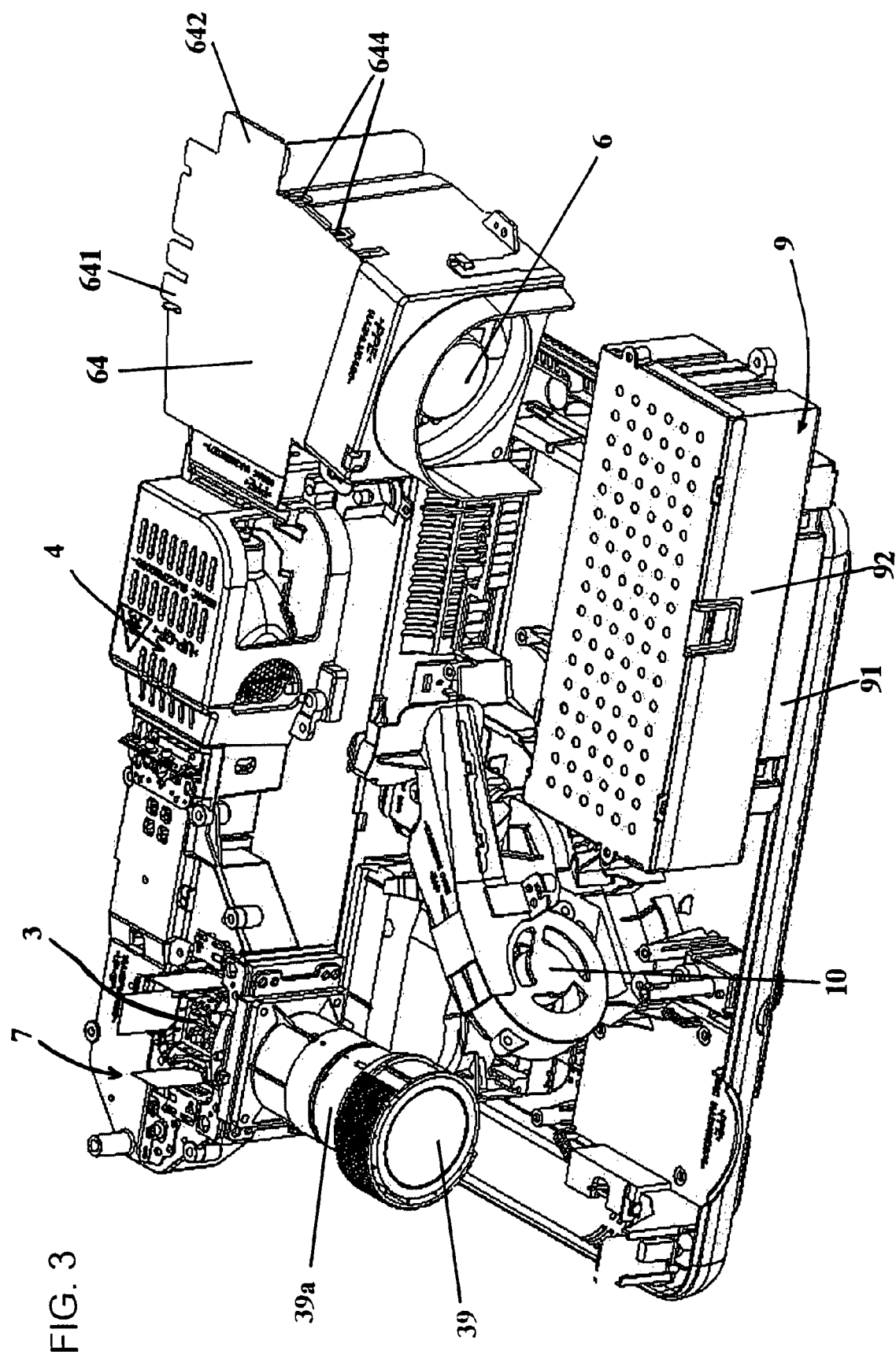
FIG. 3 is an exploded perspective view of the LC projector apparatus of FIG. 1, with the upper half section of the casing removed.

As shown in FIGS. 2 and 3, the casing 1 accommodates therein a generally L-shaped plastic optical engine 7 that includes a lamp unit 4 serving as a light source, an optical system 2 (FIG. 5) for splitting the white light received from the lamp unit into three beams of three primary colors (R, G, B beams); and an image synthesizing device 3 adapted to illuminate three LCPs (B-, G-, and R-LCP) with the B, G, and R beams to obtain imaging lights of three primary colors (B, G, and R imaging light) and synthesize them into a beam of tricolor imaging light. The lamp unit is arranged at the right end of the optical engine 7, and the image synthesizing device 3 in the front end of the optical engine 7. The optical system 2 is arranged on the optical path starting from the lamp unit to the image synthesizing device 3 of the optical engine 7.

There is provided in the casing 1 a cylindrical body 39a for holding a projection lens 39, the base of which cylindrical body 39a is connected to the front end of the optical engine 7, and a power supply unit 9 installed in front of the optical engine 7.

Figure 4:
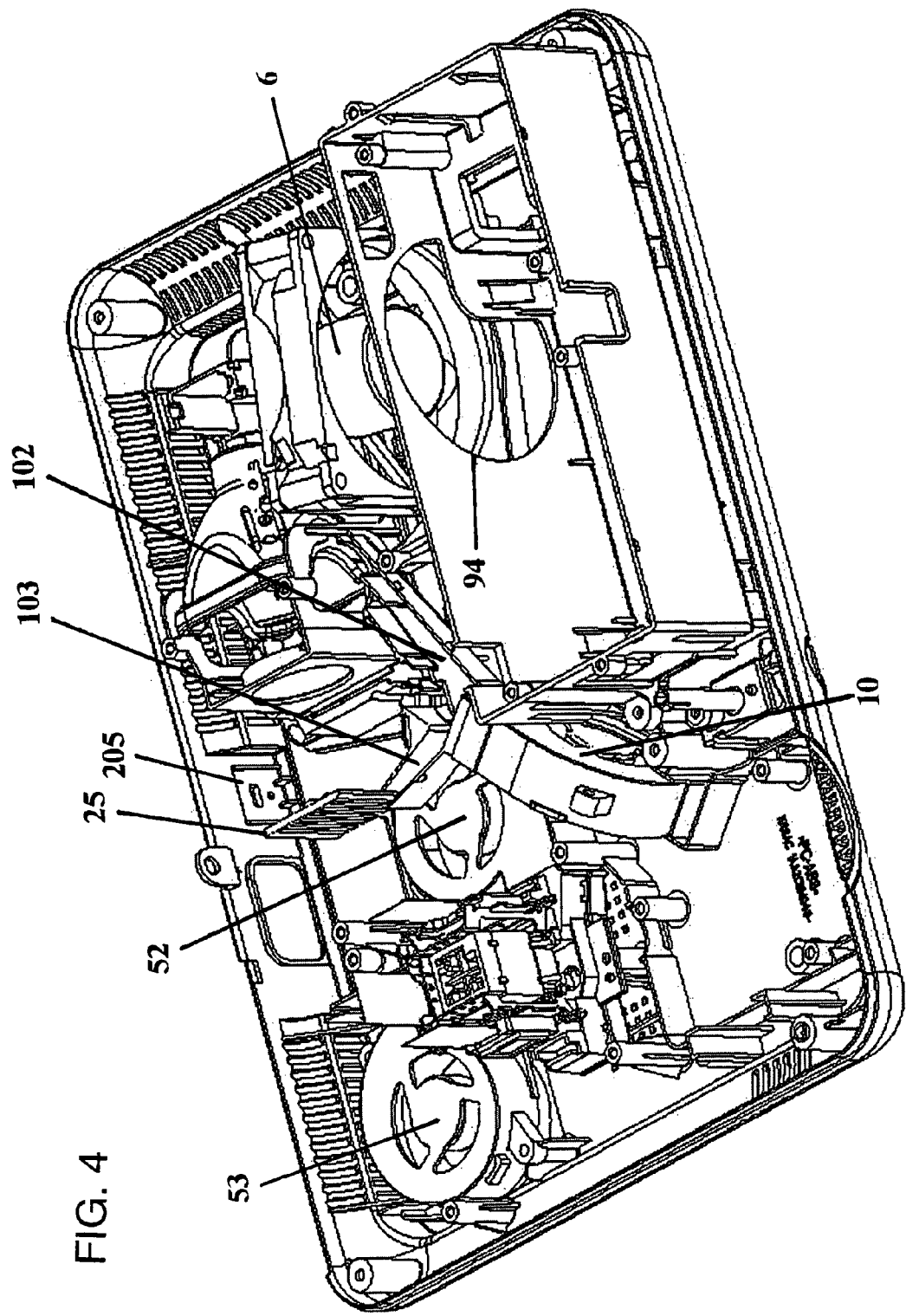
FIG. 4 is a perspective diagram in which showing the upper half section of the LC projector apparatus, and with the optical system of the projector apparatus were partially removed together with the power supply unit.

A cooling unit is mounted on the lower half section 12, as shown in FIGS. 3 and 4. The cooling unit has a third fan 52 and a fourth fan 53 in the left area of the projector apparatus, a second fan 10 in the central area, and a first fan 6 in the right area. The third fan 52 and the fourth fan 53 are located below the image synthesizing device 3 to cool the image synthesizing device 3. Formed in the bottom wall of the lower half section 12 is a bottom air intake window (not shown) for use with the first exhaust fan 52 and the fourth fan 53.

The structures of the components of the LC projector apparatus of the present invention will now be described in detail below.

Optical System 2

Figure 5:
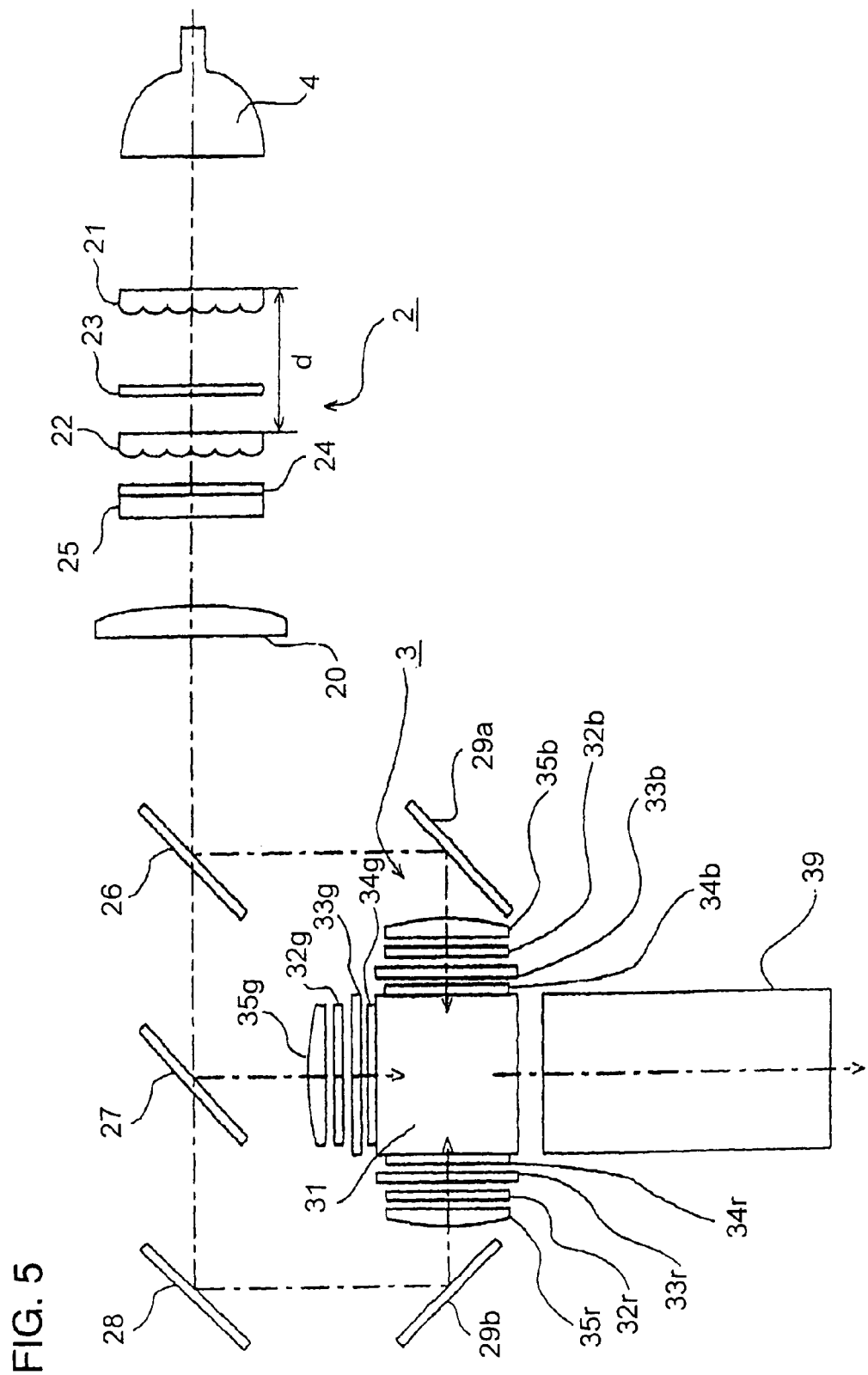
FIG. 5 is a diagram showing the arrangement of the optical system of the LC projector apparatus.

The white light received from the lamp unit is led to a first dichroic mirror 26 via a first integrator lens 21, a pre-stage light shielding lattice 23, a second integrator lens 22, a post-stage light shielding lattice 24, a polarization prism substrate 25, and a condenser lens 20, as shown in FIG. 5.

The first integrator lens 21 and second integrator lens 22 are fly-eye lenses made of a heat resistive glass, adapted to uniformize the illumination distribution of the while light emitted from the lamp unit. The pre-stage light shielding lattice 23 and the post-stage light shielding lattice 24 are thin aluminum films adapted to block incident light that is not wanted by the polarization prism substrate 25.

As shown in FIG. 5, the light that has passed through the polarization prism substrate 25 is collected onto the first dichroic mirror 26 by a condenser lens 20. The first dichroic mirror 26 reflects only a blue component of light, letting red and green components of light pass through it, while a second dichroic mirror 27 reflects green component of light, and allows red component of light to pass through it. A field mirror 28 reflects green light. Thus, the white light emitted from the lamp unit is split by the first and second dichroic mirrors 26 and 27 into blue (B), green (G), and red (R) light, which are respectively led to the image synthesizing device 3.

Image Synthesizing Device 3

Figure 6:
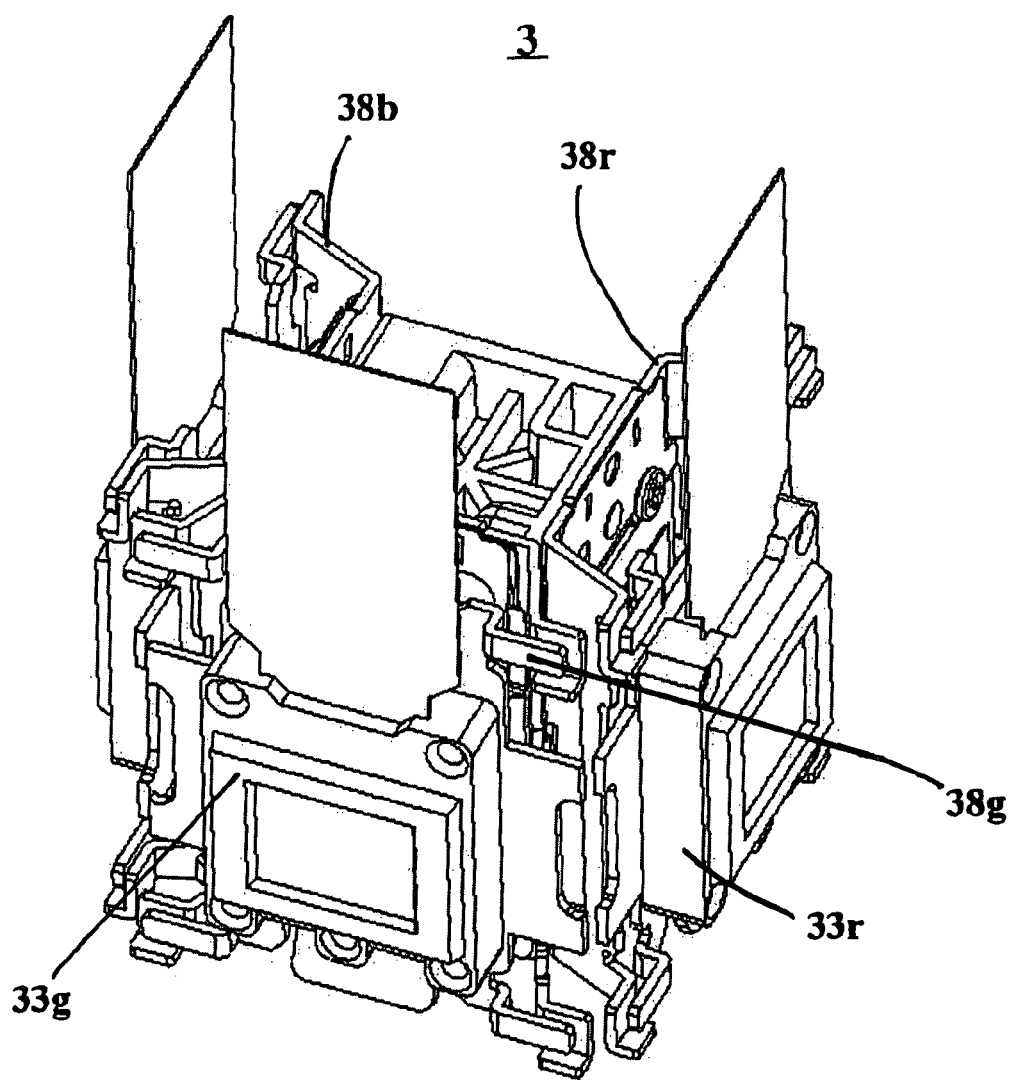
FIGS. 6 and 7 are perspective views of an image synthesizing device of the LC projector apparatus.
Figure 7:
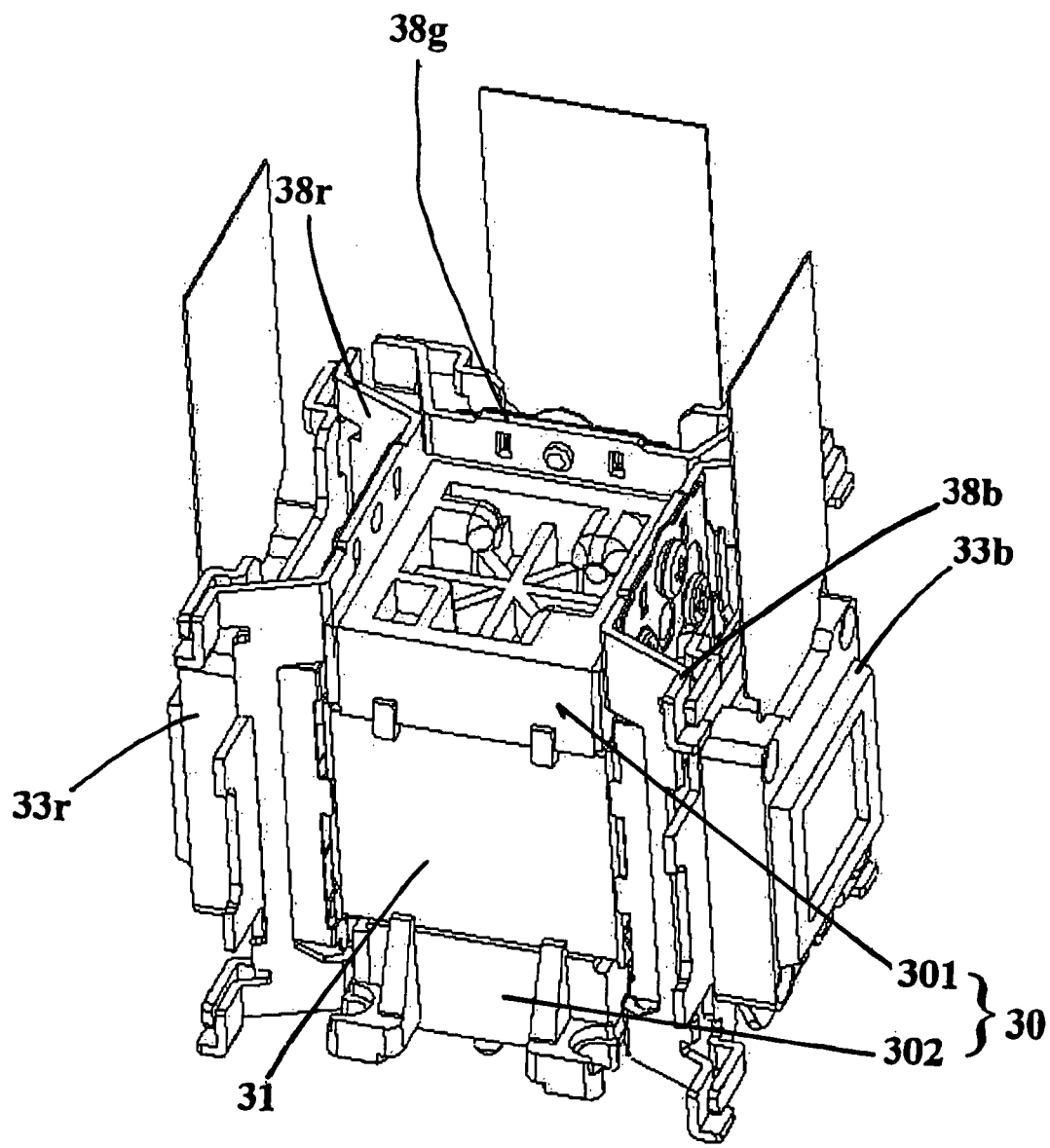

As shown in FIGS. 6 and 7, the image synthesizing device 3 includes a cubic color synthesizing prism 31, a prism mount 30 having an upper prism mount 301 and a lower prism mount 302, for fixing the prism, an LCP 33b for blue light, an LCP 33g for green light and an LCP 33r for red right (the three LCPs hereinafter referred to as B-, G-, and R-LCP, respectively) which are arranged on the respective three faces of the color synthesizing prism 31, LCP holders 38b, 38g, and 38r for securely fixing the respective B-, G-, and R-LCP. The LCP holders 38b, 38g, and 38r are jointed to the prism mount 30 to form an integrated image synthesizing device.

The image synthesizing device 3 is placed in the optical engine 7 through an opening 172 formed in the lid 7a of the optical engine 7.

The blue light reflected by the first dichroic mirror 26 and a field mirror 29a is led to a condenser lens 35b, as shown in FIG. 5, and then to the color synthesizing prism 31, via a blue incidence polarization plate 32b, the B-LCP 33b, and a blue emergence polarization plate 34b.

Similarly, the green light beam reflected by the second dichroic mirror 27 is directed to a condenser lens 35g, and then led to the color synthesizing prism 31 via a green incidence polarization plate 32g, the G-LCP 33g, and a green emergence polarization plate 34g.

Similarly, the red light reflected by two field mirrors 28 and 29b are led to a condenser lens 35r, and then to the color synthesizing prism 31 via a red incidence polarization plate 32r, R-LCP 33r, and a red emergence polarization plate 34r.

The three B, G, R beams led to the color synthesizing prism 31 are synthesized by the color synthesizing prism 31 into a beam of tricolor imaging light, which is projected by the projection lens 39 onto a front screen.

Figure 8:
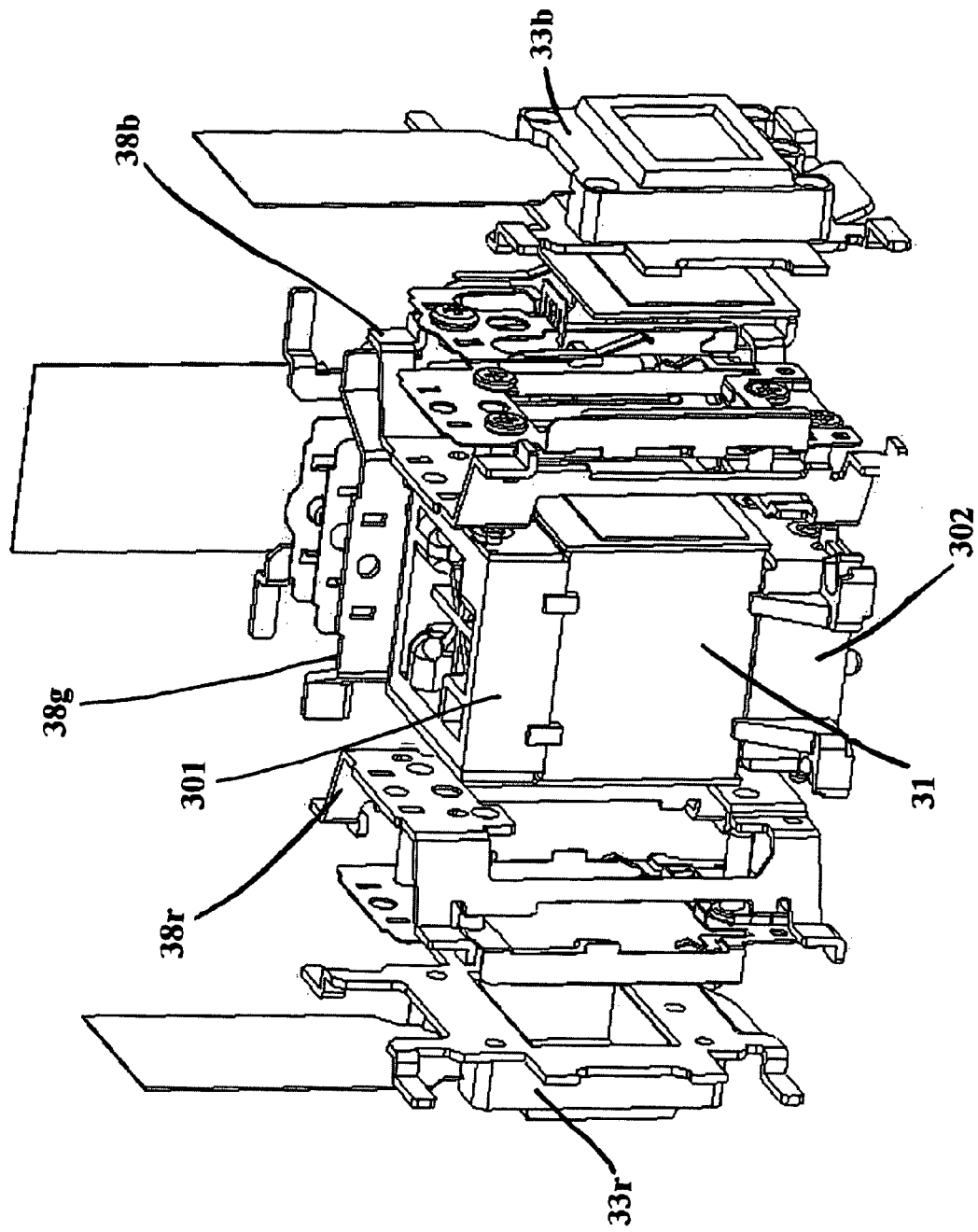
FIG. 8 is an exploded perspective view of the image synthesizing device of the LC projector apparatus.

As shown in FIGS. 6, 7, and 8, the prism 31 is securely fixed by the upper and lower prism mount 301 and 302, respectively. The LCP holders 38b, 38g, and 38r are securely fixed to the upper prism mount 301 and the lower prism mount 302. The B-LCP 33b, G-LCP 33g, and R-LCP 33r are securely fixed on the respective LCP holders 33b, 33g, and 33r. Normally, the B-LCP 33b, G-LCP 33g, and R-LCP 33r and LCP holders 33b, 33g, and 33r are adjusted for correct condensation and focusing of the B-, G, R-light, and firmly fixed by soldering.

Figure 9:
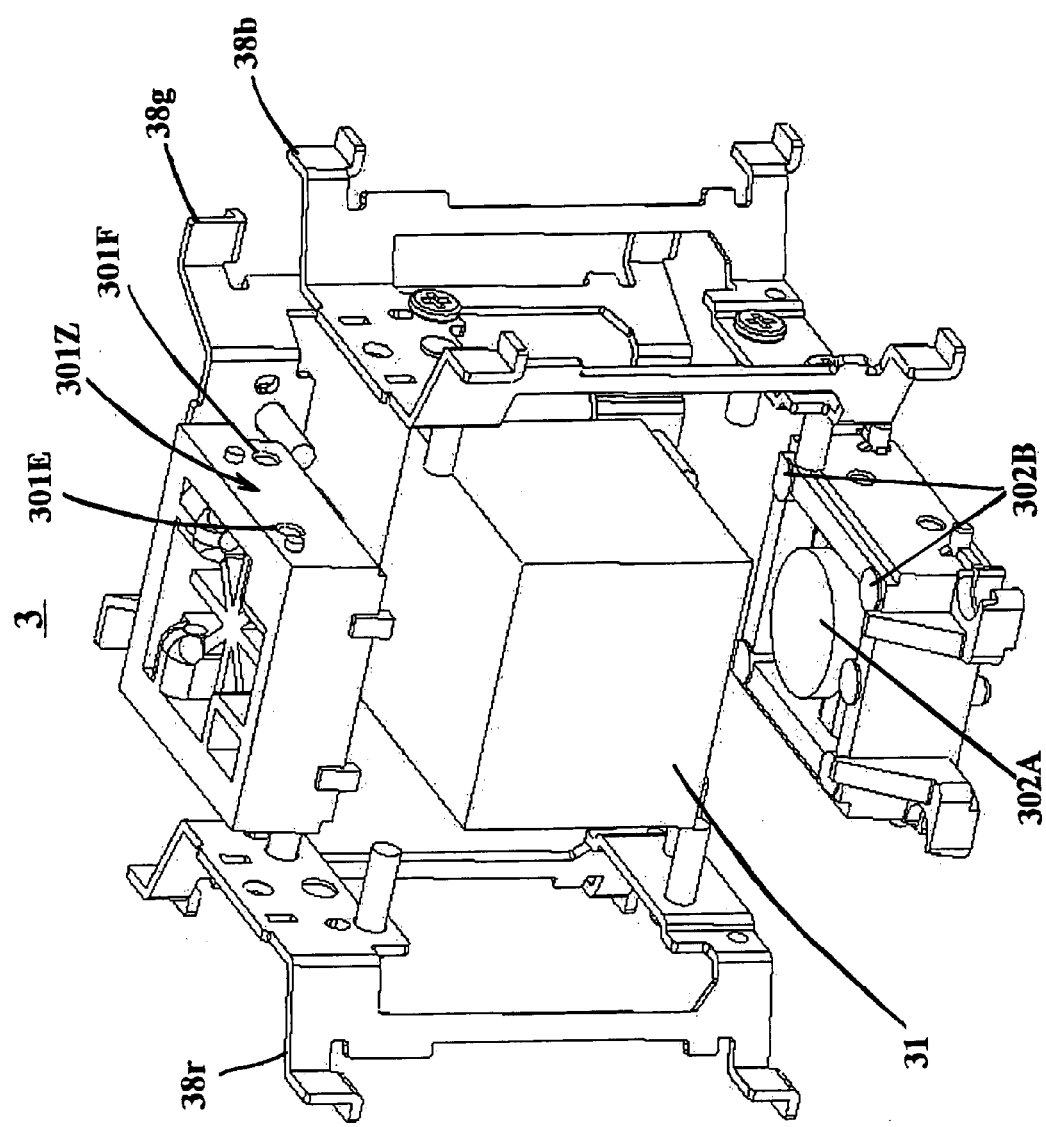
FIGS. 9 and 10 are exploded perspective views of a prism, a prism mount, and LCP holders.
Figure 10:
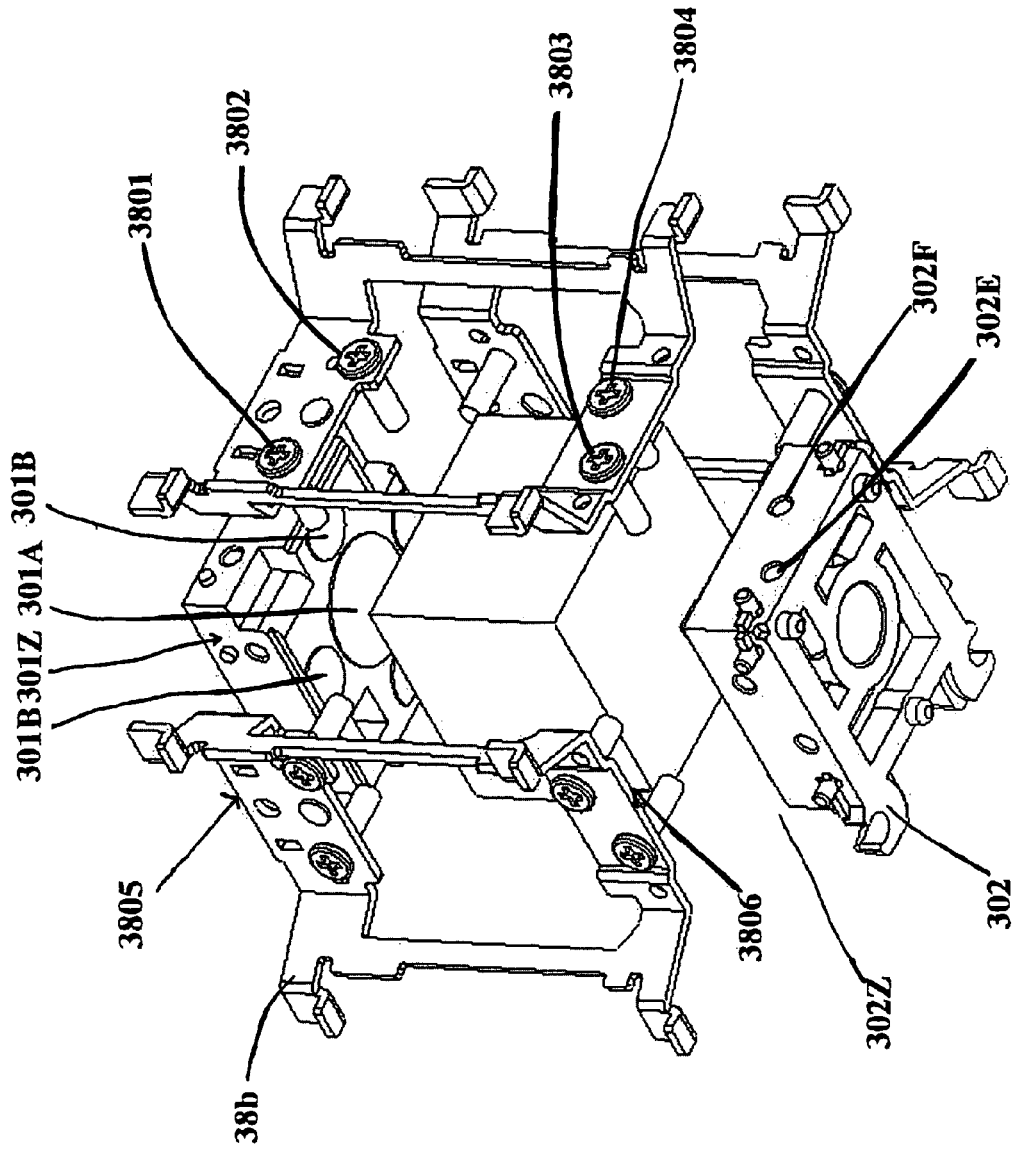

As shown in FIGS. 9 and 10, the prism 31 is jointed to the prism mount 30 such that the upper and lower ends of the prism 31 are jointed to the corresponding joint surfaces 301A, 301B of the upper prism mount 301 and to the joint surfaces 302A and 302B of the lower prism mount 302, respectively. The joint surfaces 301A and 302A correspond to the upper and lower central areas of the prism 31, and the joint surfaces 301B and 302B correspond to the peripheral areas of the prism 31.

In conventional image synthesizing devices joint surfaces 301A and 302A are provided only in the central area of a prism mount, so that they have low peel strength. The image synthesizing devices 3, now provided with additional small joint surfaces 301B and 302B on the periphery of the prism mount 30 near the prism 31 in accordance with the invention, has an improved peel strength of 20 Kgf or greater as compared with the original peel strength of 17 Kgf. In the example shown herein, a UV adhesive was used to bond the prism 31 to the joint surfaces 301A, 301B, 302A, and 302B. It is noted here that the dimensions and the distribution of the small joint surfaces 301B and 302B can be adjusted depending on the conditions of the joint surfaces.

Referring again to FIGS. 9 and 10, it is seen that the prism 30 jointed to the LCP holders 38b, 38g, and 38r by the threads of screws 3801, 3802, 3803, and 3804 engaging corresponding threads of bores 301E, 301F, 302E, and 302F. Screws 3801 and 3802 are provided at suitable positions in the lower sections of the LCP holders 38b, 38g, and 38r. The threaded bores 301E and 301F are formed in the side of the upper prism mount 301, and the threaded bores 302E and 302F are formed in the side of the lower prism mount, respectively. The threaded bores 301E and 301F are mutually offset in the vertical direction, so that they do conflict each other.

When the prism mount 30 is made of a resin, if the lengths of the screws are not sufficiently long (for example, when the length is less than 6 mm for a 20 mm prism), unbalanced torsional moments of forces appear in the prism mount 30, which moments can easily cause wear of the screws. Such wear advertently affects the production of the prism mount. In the invention, therefore, positions of the upper and lower threaded bores are offset from each other so that longer screws can be used. Although only a few of the threaded bores are shown in FIGS. 9 and 10, threaded bores are formed in all of the sides of the prism mount 30 and of the LCP holders 38b, 38g, and 38r that are associated with each other. The number of the threaded bores can be changed depending on particular use conditions.

Referring to FIGS. 7 and 10, positioning of the LCP holders 38b, 38g, and 38r on the prism mount 30 will be described. Since three LCP holders 38b, 38g, and 38r have a similar positioning structure, only the LCP holder 38b will be described below. It should be understood, however, that the remaining LCP holders 38g and 38r could have a similar positioning structure. The upper prism mount 301 and the lower prism mount 302 are provided with respective side 301Z and side 302Z that correspond to the respective sides 3905 and 3806 of the LCP holder 38b, as shown. As seen in FIG. 10, when assembled, the side 301Z is in contact with the mating side 3805, and the side 302Z in contact with the mating side 3806.

It is noted that in conventional structures, only the fixing screws fixed to the screw pillars of the prism mount are in contact with the LCP holders, so that the stresses created by the fixing screws concentrate in the screw pillars of the prism mount, thereby deforming the screw pillars. This deformation causes inadvertent effects in condensation of light by the optical system. In contrast, in the present invention, all the sides of the prism mount are in contact with the corresponding sides of the LCP holders, so that the stresses created by the fixing screws are distributed over all the sides, thereby reducing the concentration of the stresses.

Utilizing this improved fixing configuration, the prism mount can be made of a resin to reduce the cost of the projector apparatus.

Environment tests performed in a warehouse under a condition of 40° C./90% reveal the displacement of an image is in the range 0.8 to 1 pixel at the center of a projected image if the conventional image synthesizing device is used (i.e. without using the improved prism mount of the invention). However, if the invention is applied to the prism mount, the displacements of the condensed light can be suppressed to 0.3 pixels or less.

Cooling Unit

As described previously, the cooling unit of the projector apparatus of the invention has the third fan 52 and fourth fan 53 in the left area of the projector apparatus, second fan 10 in the central area, and first fan 6 in the right area. Further details of the cooling unit will be given below.

FIG. 2 shows the arrangement of a lamp unit 4 serving as the light source in proximity to the right wall of the lower half section 12 of the casing 1 of the projector apparatus, and a power supply unit 9 located away from the light source. The first fan 6 is installed between the lamp unit 4 and the power supply unit 9 with its inspiration face oriented to the power supply unit 9 and its expiration face to the lamp unit 4. The expiration face of the first fan 6 is set at a predetermined angle with respect to the optical axis of the light source. The angle is most preferably 12 degrees. Further, the inspiration face of the first fan 6 is installed at an oblique angle relative to the power supply unit 9. The oblique angle can be in the range from 5 to 30 degrees, and is preferably 12 degrees.

As seen in FIG. 2, there are provided on the air expiration side of the first fan 6 vertical panels 61, 62, and 63, and a top panel 64. The space surrounded by these panels and the bottom wall and the sidewalls of the casing serves as an exhaust duct. Air outlet sections of the sidewalls of the casing define two elongate exhausts 611 and 631. (Similar exhausts are also defined in a corresponding section of the upper half section 11.) The top panel 64 located above the exhaust duct serves as a baffle (FIG. 2). The rear section of the baffle will be described in detail later. As will be clear from FIG. 11, the expiration face of the first fan 6 and the lamp unit 4 do not wholly overlap with each other, i.e. they are offset at a predetermined distance. That is, the first fan 6 is displaced relative to the lamp unit 4 towards the sidewall of the casing by a predetermined distance, so that only a portion of the air expired from the first fan 6 is blown to the lamp unit 4. The rest of the air is blown to circumvent the lamp unit 4 and discharged from the exhaust duct. Formed on the opposite sides of the lamp unit 4 are openings 41 and 42 to introduce into the lamp unit 4 a portion of the air expired from the first fan 6 through the opening 41. The air flows out of the lamp unit 4 through the opening 42. In order to smoothly discharge the cooling air from the lamp unit 4, it is necessary to set the angle of the exhaust duct in the range from 5 to 30 degrees. The angle of 12 degrees is particularly preferable. The angle of the exhaust duct can be defined to be the angle between the vertical plate 63 of the exhaust duct and the optical axis of the light source. Since the air expired from the first fan 6 is not totally passed through the high-temperature lamp unit 4, the temperature of the exhaust air flowing out of the exhausts 611 and 631 of the casing is sufficiently low that it does not hurt the user of the projector apparatus. In this instance, the proportion of the air that is expired from the first fan 6 to the air allocated to the lamp unit 4 is about one half.

In order to cool the power supply unit 9 through ventilation thereof, the air inspiration face of the first fan 6 is communicated with the hole 94 formed in the sidewall of the frame of the power supply unit 9. Referring to FIG. 4, it is seen that the power supply unit is installed at a predetermined oblique angle with respect to the first fan 6. The optimal oblique angle is 10 degrees.

Figure 12:
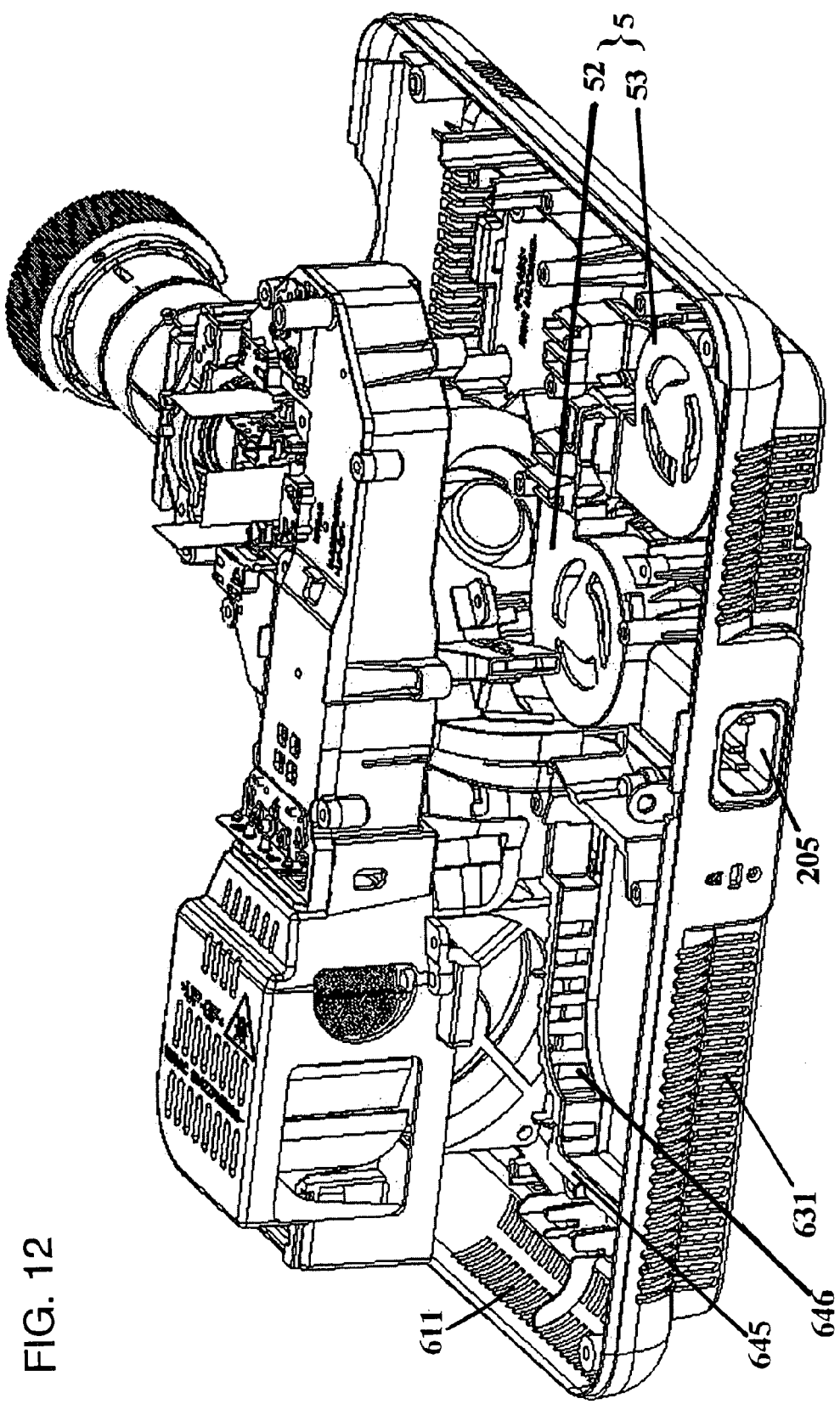
FIG. 12 is an exploded perspective view of the LC projector apparatus as seen from a lateral backward position, showing a cooling unit below the image synthesizing device.
Figure 13:
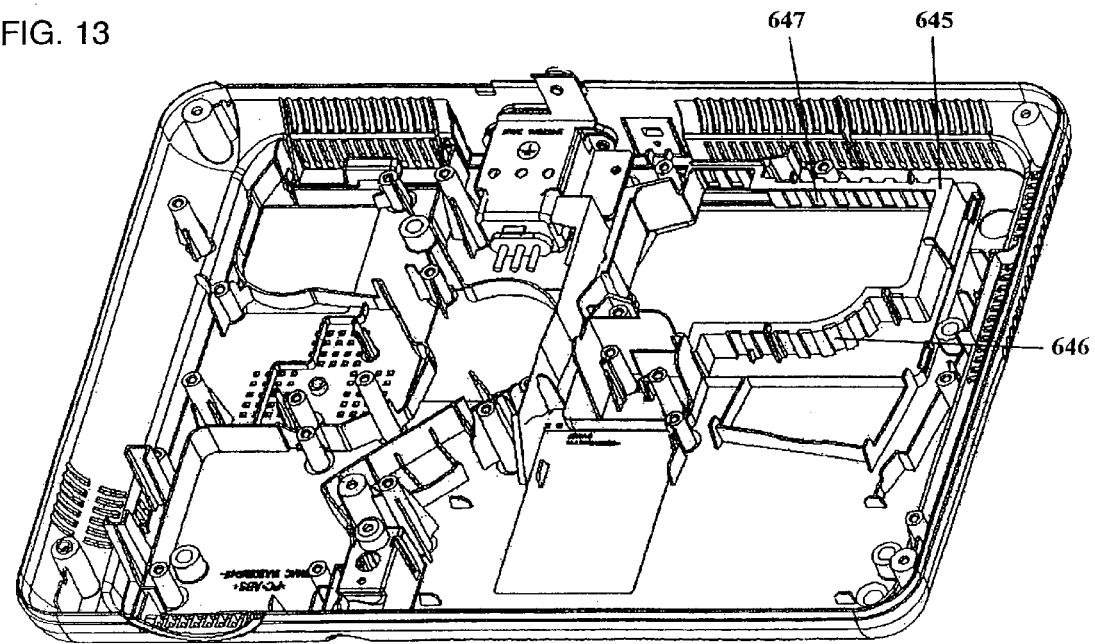
FIG. 13 is a perspective view of an exhaust duct associated with a first fan below a light source, showing air streams in the exhaust duct.

In order not to cause hot air to stagnate in the upper section of the first fan 6, it is necessary to set up the first fan 6 higher than the lamp unit 4. But in doing so, the overall height of the projector apparatus must be taken into account. As an example, the first fan 6 is raised by 5 mm. To do so, a mount structure for raising the lamp unit 4 may be provided to the exhaust duct under the lamp unit 4. For example, a generally U-shaped pedestal 645 for raising the lamp unit 4 may be provided on the bottom of the casing, as shown in FIGS. 12 and 13. In the example shown herein, the height of the pedestal is set to 5 mm. The pedestal 645 is provided with openings 646 and 647 formed in the bottom wall of the exhaust duct and along the route of the exhaust duct for the first fan 6 so as to allow the exhaust air expired from the first fan 6 to be discharged through these openings towards the underside of the lamp unit 4. In this way, if heat accumulates in the bottom section of the projector apparatus held upside down or hung during its use, the heat is easily and successfully discharged.

Figure 11:
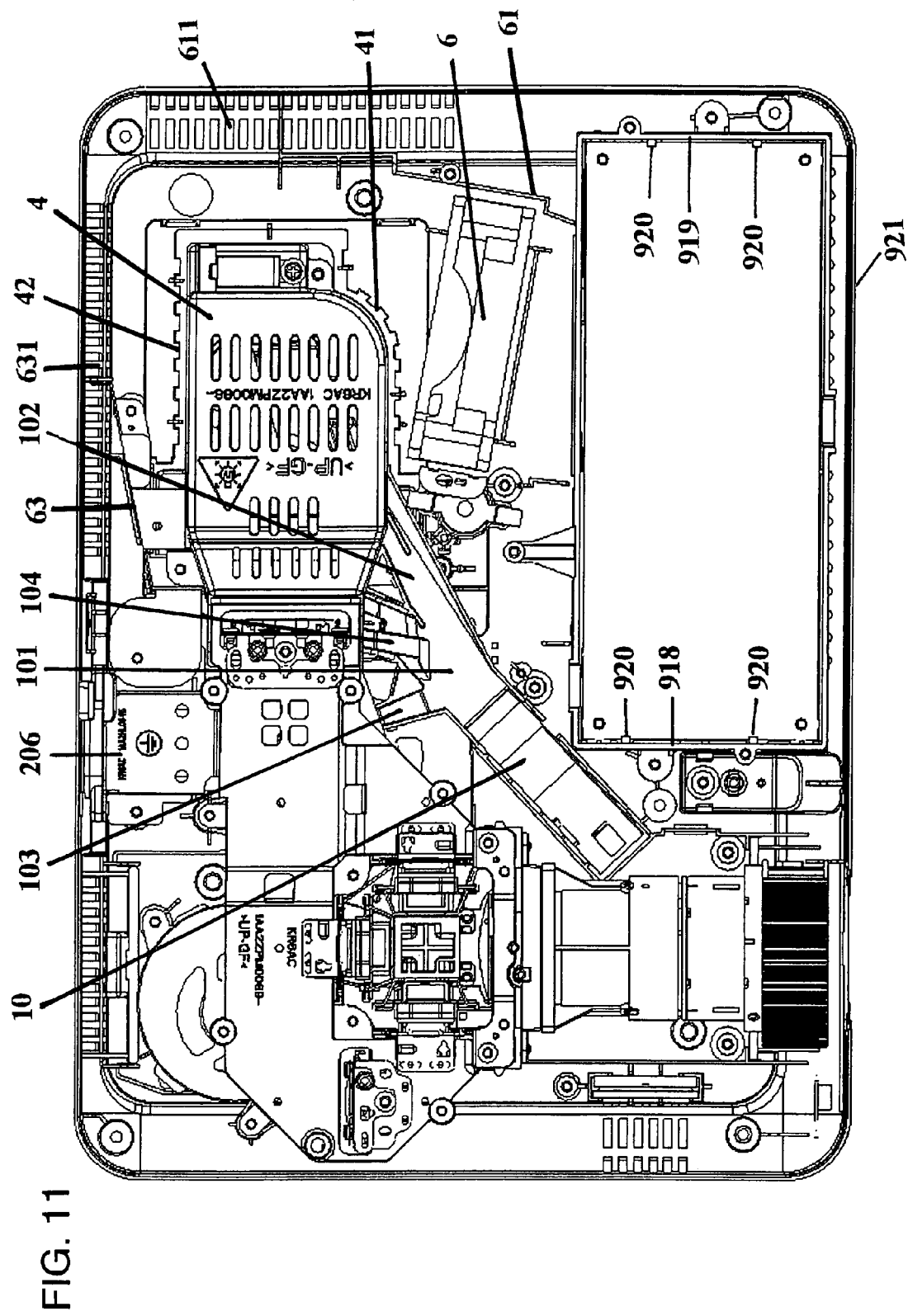
FIG. 11 is a bird's eye view of the LC projector apparatus with its upper half section of the casing removed to show the internal arrangement of the LC projector apparatus.

Referring to FIGS. 3, 4, and 11, it is seen that the second fan 10 is installed in the central area of the projector apparatus to inspire air inside the projector apparatus. Although the air in this area tends to stagnate, the second fan 10 facilitates exhaustion of the air by decreasing the inner pressure in this area. Referring particularly to FIG. 11, there are shown a cooling duct 101 that includes a multiplicity of bifurcating cooling ducts, provided on the air expiration side of the second fan 10. Of these cooling ducts, a first bifurcating cooling duct 102 communicates mainly with the lamp unit 4, and a second bifurcating cooling duct 103 communicates with the polarization prism substrate 25 of the optical system. Additional bifurcating cooling ducts that communicate with other components (including other optical elements) may be provided as needed, as shown in FIG. 11. For example, a third bifurcating cooling duct 104 communicates with the area between the light source and the polarization prism substrate 25 where the lens unit is arranged.

As a result of the exhaustion of air by the first bifurcating cooling duct 102 and the first fan 6, the lamp unit 4 is cooled that the exhaust air temperature will be low. The outlet of the second bifurcating cooling duct 103 has a shape adequate to cool the polarization prism substrate 25. When the outlet is elongate, the air discharged therefrom flows along the bottom of the projector apparatus and across the polarization prism substrate 25. The cooling air that has passed across the polarization prism substrate 25 can be used by the cooling unit placed near a power supply socket 205 (FIG. 12).

The exhaust ends of the first bifurcating cooling duct 102, second bifurcating cooling duct 103, and the third bifurcating cooling duct 104 have predetermined areal ratios and configurations according to the requirements of the elements to be cooled.

Referring to FIG. 12, there is shown under the image synthesizing device 3 a cooling unit 5 for cooling the image synthesizing device 3. The cooling unit 5 includes a third fan 52 and a fourth fan 53. The ambient air inspired by the third and fourth fans 52 and 5, respectively, is lead to the three LCP boards 33b, 33g, and 33r and three polarization plates 32b, 32g, and 32r shown in FIG. 5 through associated ducts. The third fan 52 and the fourth fan 53 are installed such that the streams of air expired from them intersect each other.

In the embodiment shown herein, the air sent from the third fan 52 is partly blown to the blue incidence polarization plate 32b and B-LCP 33b, and partly to the red incidence polarization plate 32r and R-LCP 33r. The air sent from the fourth fan 53 is partly blown to the green incidence polarization plate 32g, and G-LCPs 33g, and partly to the red incidence polarization plate 32r and R-LCP 33r.

In conventional projector apparatuses, a cooling unit has three dedicated cooling fans one for each of the R-, G-, B-LCPs. In the inventive LC projector apparatus, the cooling unit has only two cooling fans 52 and 53, which suffice to cool the incidence polarization plates 32r, 32g, and 32b and the LCPs 33r, 33g, and 33b. In this way, a space for one cooling fan is cut down, which can be advantageously utilized for minimization of the projector apparatus. Further, the total operating power consumption of the projector apparatus can be also reduced by the amount that would be otherwise consumed by the cooling fan.

In addition, the LCP projector apparatus of invention has a low power consumption mode where the intensity of light of the lamp unit 4 is reduced to a lower level. In the low power consumption mode, the rotational speeds of the first and second exhaust fans 52 and 53, respectively, can be reduced to further reduce the noise level of the exhaust unit.

Upper Metal Panel Structure Above Light Source

Referring to FIGS. 2 and 3, the projector apparatus of the invention has a metal plate structure in the form of a top panel 64 extending over the light source. The top panel 64 covers the upper part of the lamp unit 4 serving as the light source. The top panel 64 is located adjacent the upper section of the expiration face of the first fan 6, and forms the baffle of the exhaust duct for the first fan 5.

The top panel 64 is configured to exactly fit the top end of the lamp unit 4, and has a multiplicity of cut sections in the two edges thereof adjacent to the casing. The top panel 64 also has a multiplicity of ribs 641 and 641 of different widths. The top panel 64 is made of copper or aluminum, so that it has good heat radiation performance. It can be made of any alternative metal having good heat radiation performance. It radiates heat generated by the light source during operation, and, particularly afterheat of the light source after the cooling fans are stopped.

Figure 15:
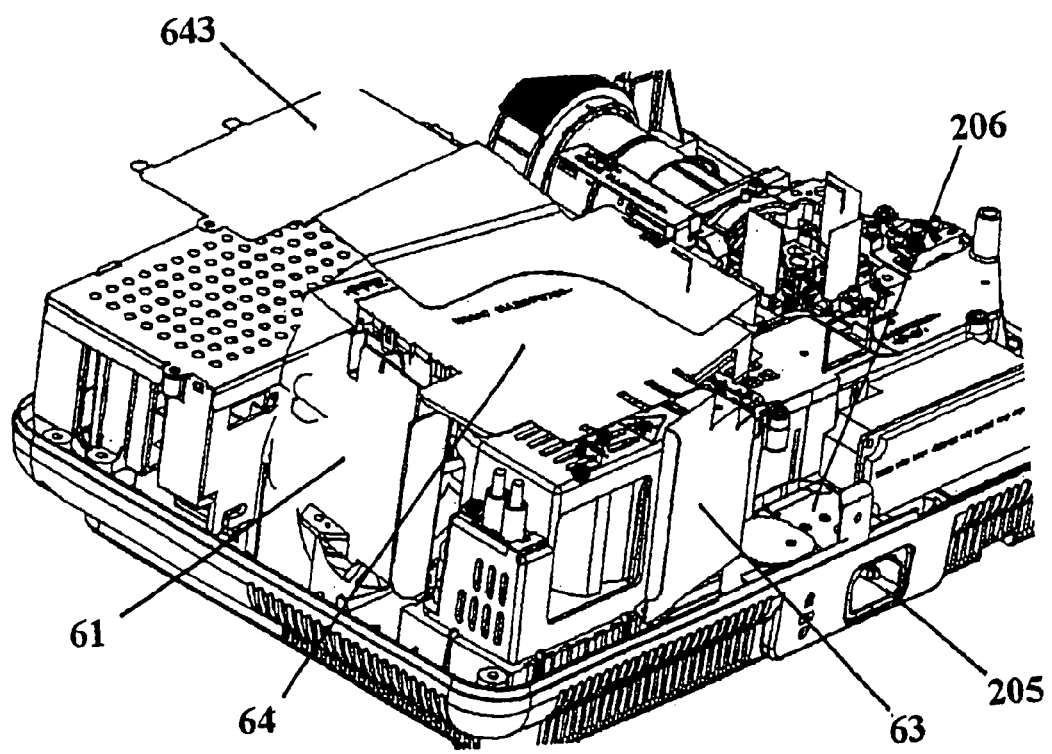
FIG. 15 is a perspective view of a metal plate structure that extends above the light source.

Provided at the periphery of the top panel 64 are curved pawls 644 for positioning the top plate 64. In the example shown herein, the top panel 64 is assembled on top of the frame of the first fan (i.e. on the vertical plate 61 of the exhaust duct) by pawls 644 and projections. (See also FIGS. 11 and 15.)

In addition to radiating heat generated by the light source, the metal plate structure shields the electromagnetic radiation from the lamp of the light source. Owing to the metal plate structure, the casing of the projector apparatus can be made of a resin, without coating it with an electroplated metal layer. When the metal plate structure is used as a shield plate, it is necessary to connect it with a grounded metal member. It is noted that the top plate can be formed of a non-metallic material and coated with an electroplated metal layer when it is used as a shield plate. Referring to FIG. 2 again, there is shown on top of the top panel 64 a further top shield plate 643, which is jointed to a power supply shield case 924 located on the air inspiration side of the first fan and the vertical metal plate 63 of the exhaust duct for the lamp unit 4. (See also FIG. 11.) The vertical metal plate 63 and the grounded metal member 206 of the power supply socket 205 are jointed to serve as the shield plate. (See also FIGS. 11 and 15.)

In addition to the top panel 64, the metal plate structure may include a latticed lateral panel 60a, which is perpendicular to the top panel 64 and extends to above the air expiration face of the first fan 6, all integrated together. (See also FIGS. 24 and 25.) The lateral panel 60a constitutes a part of the exhaust duct for the first fan 6, facilitating exhaustion of air and protection of the first fan 6.

Fixation Structure of Power Supply Circuit Board

Referring to FIG. 3, the frame of the power supply unit 9 in accordance with one embodiment consists of a lower frame 91 in contact with the bottom of the casing and an upper frame 92 located above the lower frame 91. Each of the lower and upper frames 91 and 92, respectively, is substantially rectangular in shape.

Figure 14:
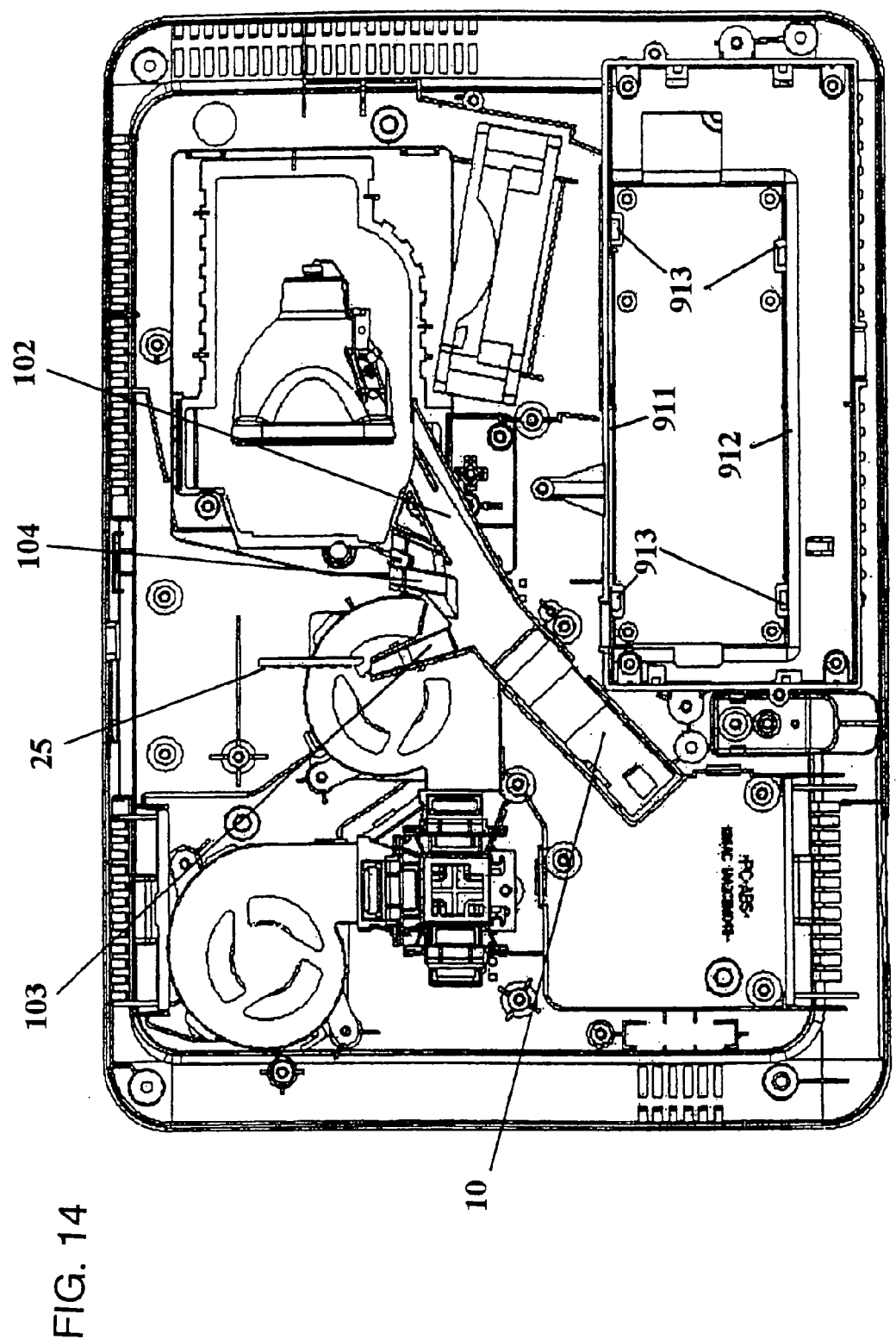
FIG. 14 is a plan view of the cooling ducts for a fourth fan, distributed in the central region of the projector apparatus.
Figure 16:
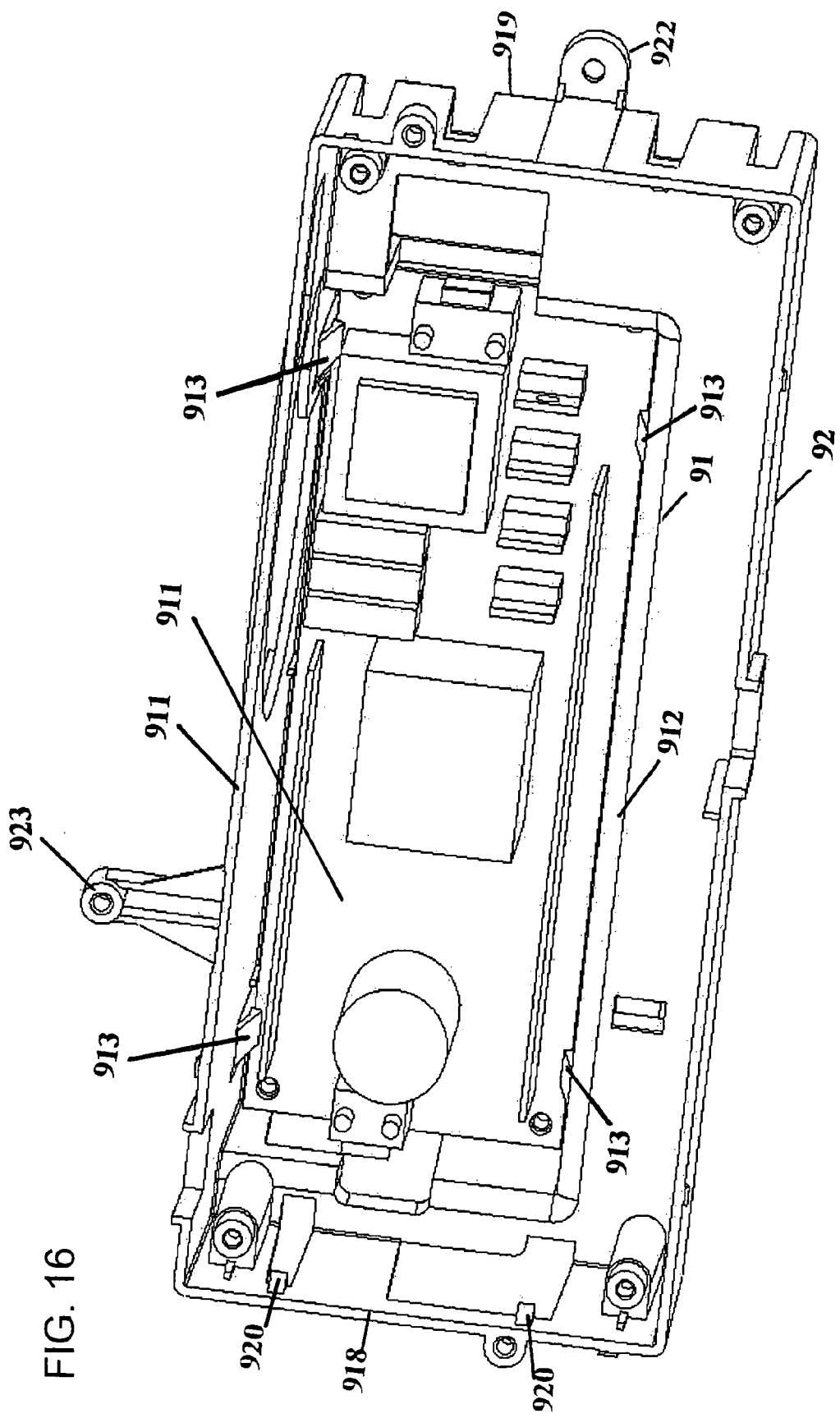
FIG. 16 is a top perspective view of a circuit board of the power supply circuit and an upper frame of a power supply unit as viewed from one side of the upper frame (the circuit board hereinafter referred to as power supply circuit board).
Figure 17:
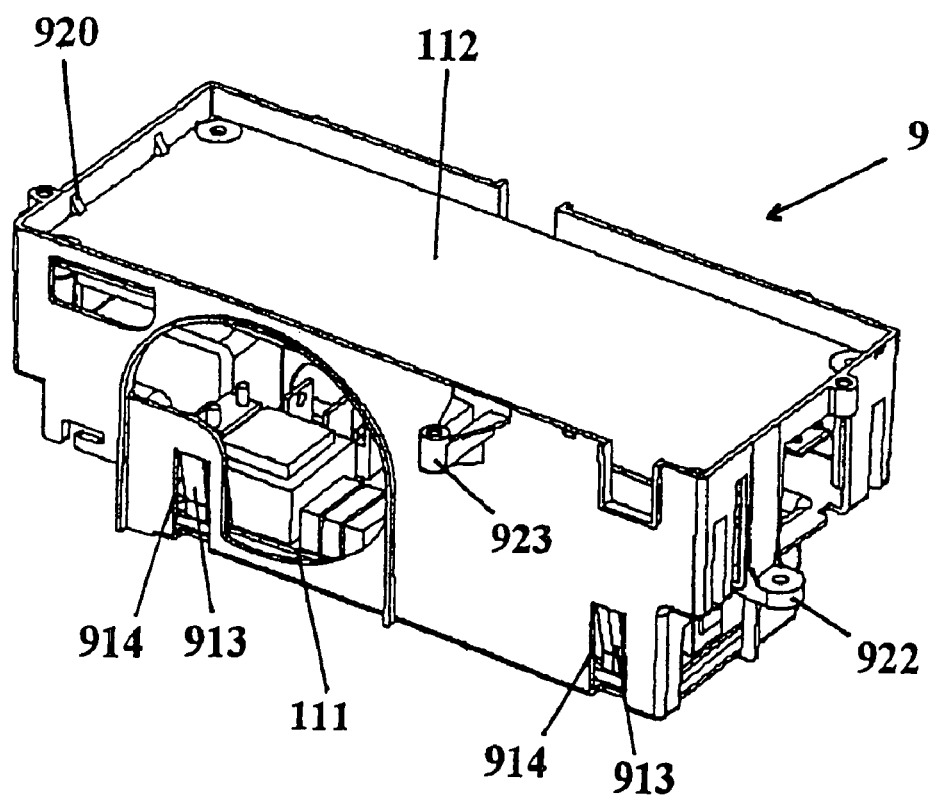
FIG. 17 is a perspective view of the power supply circuit board having board fixation structures.

FIGS. 14 and 16 are bird's eye views of the respective frames as viewed from above and one side of the frame, respectively. FIG. 17 is an oblique perspective view, of the entire power supply unit 9. As seen in this figure, the power supply circuit board includes a bottom power supply board 111 (FIGS. 14 and 16) mounted on the lower frame 91, and a top power supply board 112 (FIG. 17) mounted on the upper frame 92. In the embodiment shown herein, the bottom power supply board 111 is used as a power supply board for the light source. The top power supply board 112 is used to supply electricity to various components of the projector apparatus. The lower frame 91 is provided on each of the longer sidewalls 911 and 912 thereof with two fixation members 913. The fixation members 913 are connected at the top end thereof to the surface of the bottom power supply board 111, and securely fix the bottom power supply board 111 to the lower frame 91.

Figure 18:
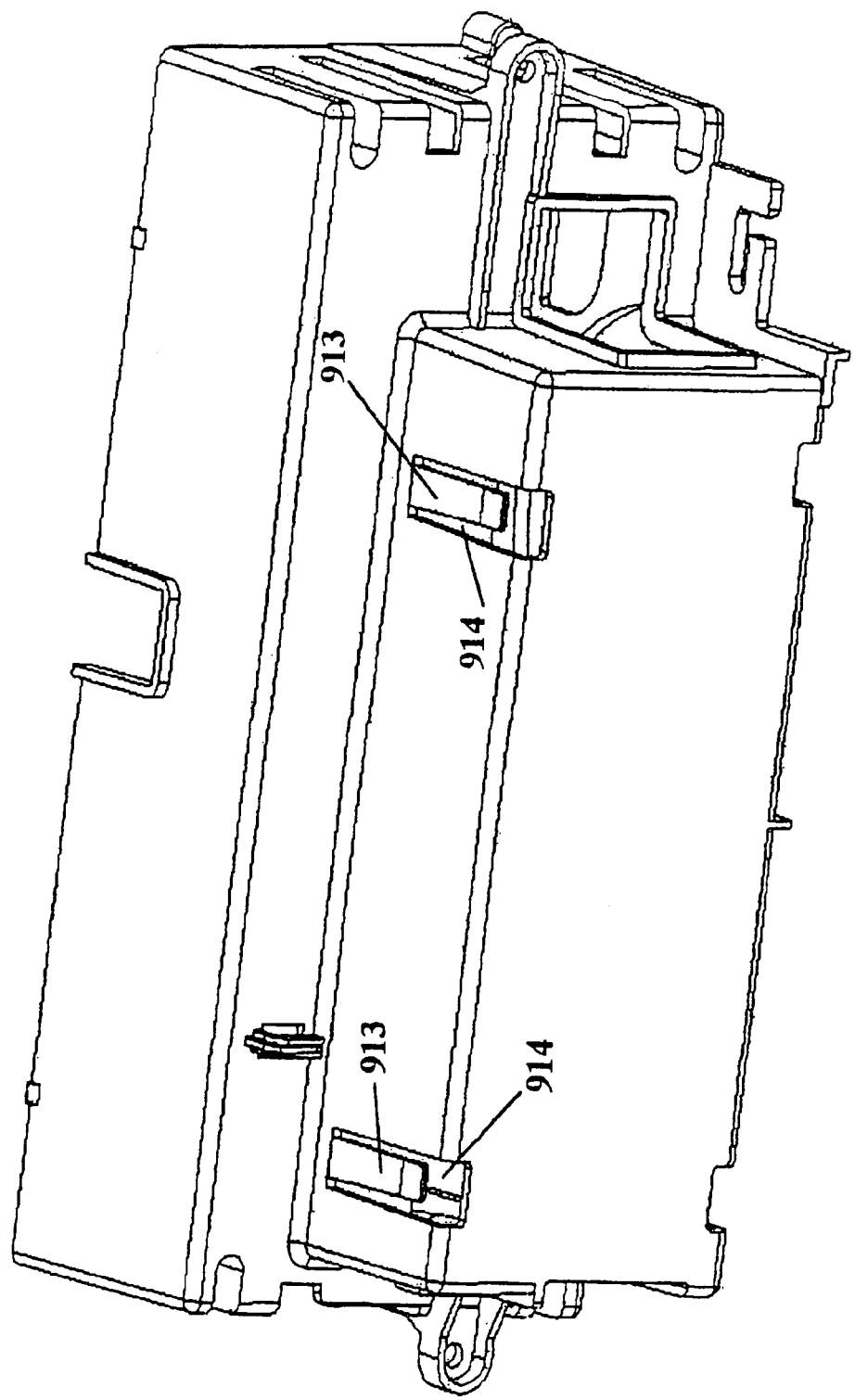
FIG. 18 is a perspective view of the frame of the power supply unit as viewed upward from a lower lateral position.

FIG. 18 is a perspective view of the frame as viewed upward from one side thereof. As seen clearly in FIG. 17, the fixation members 913 are formed on the sidewalls 911 and 912, near the bottom of the lower frame 91.

Referring to FIGS. 16 through 18, the area of the upper opening of the lower frame 91 is smaller than the bottom area of the upper frame 92. To securely fix the top power supply board 112 (FIG. 17) in proximity to the upper opening of the upper frame 92, two elastic fixation members 920 are formed on each of the shorter side walls 918 and 919 of the upper frame 92. These fixation members 920 are the same in structure as the fixation members 913 formed on the lower frame 91. Alternatively, fixation members in the form of inclined protrusions 920 as shown in FIG. 17 are engaged with the top power supply board 112 to fix it near the top end of the upper opening of the upper frame 92.

Figure 19:
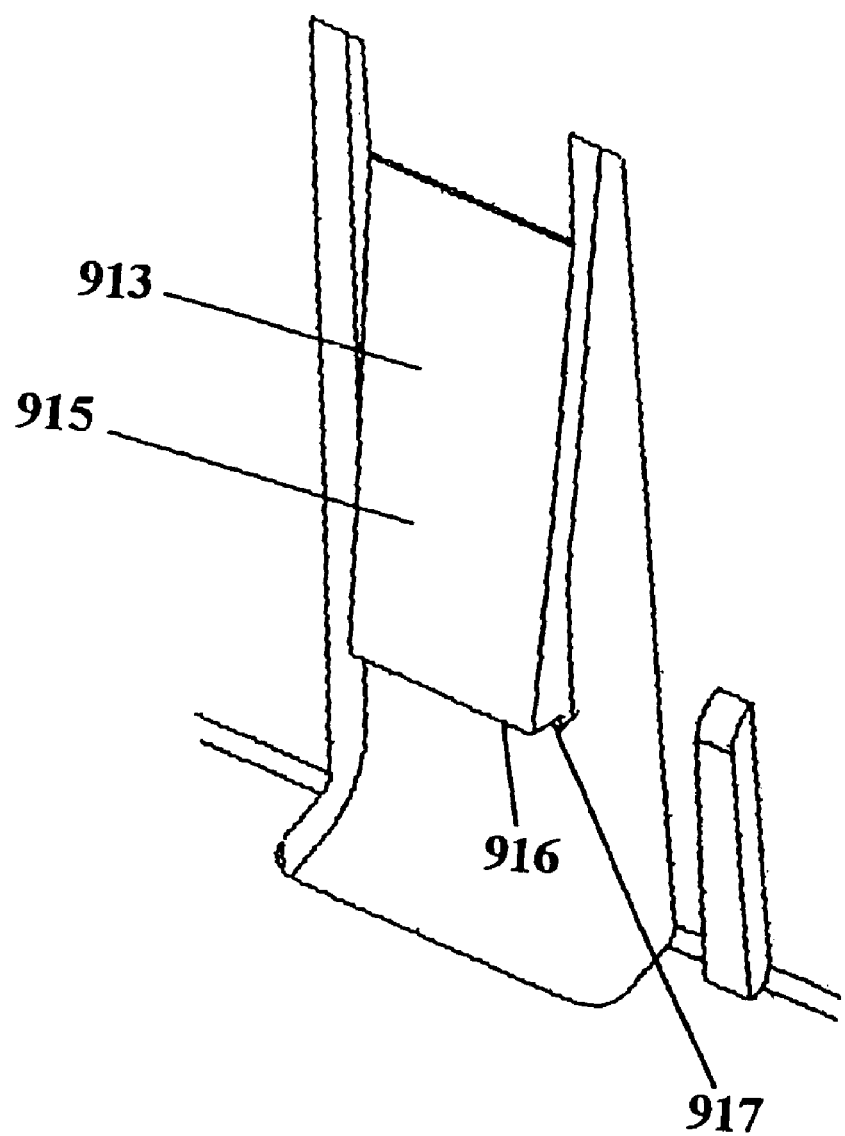
FIG. 19 is an enlarged view of a fixation member illustrated in FIG. 18.
Figure 20:
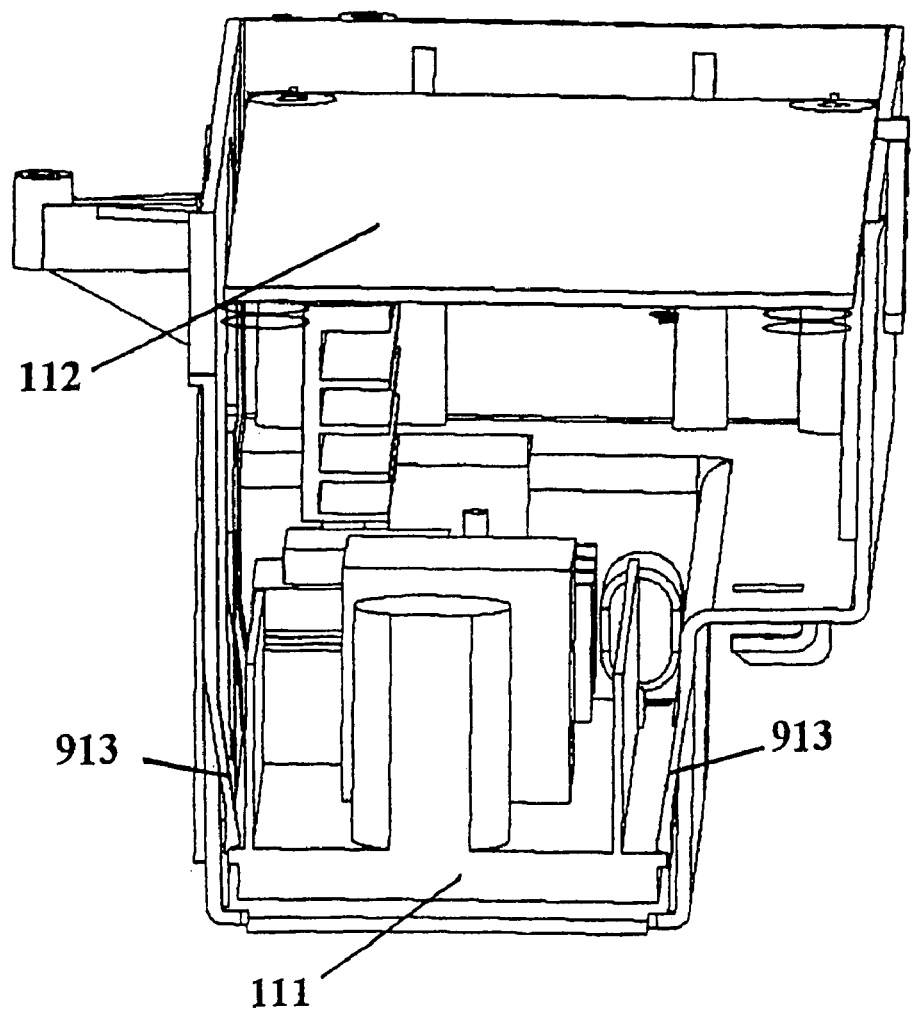
FIG. 20 shows the power supply circuit board mounted on the frame and fixed by elastic fixation members.

In this embodiment, the lower frame 91 and the upper frames 92 are resin parts that can be integrated. The fixation members 913 and 920 are integrally formed on the respective sidewalls 911 and 912 and on the sidewalls 918 and 919, extending therefrom in oblique directions toward the bottom of the casing. FIG. 17 shows openings 914 formed in the sidewalls 911 and 912, which is shaped to match the shape of the fixation members 913 and allows the fixation members 913 to depend in the openings 914 (See also FIG. 18). FIG. 19 is an enlarged view of a fixation member 913, showing that the fixation member 913 extends downward and that its thickness increases downward. It is seen in FIG. 19 that the thickness of each fixation member 913 becomes largest at the lowest end 916 thereof and that the fixation member 913 has a generally L-shaped upward step 917 formed on the lowest end 916.

Referring to FIGS. 16 and 17, there are shown projections 922 and 923 for joining the power supply unit to the casing, formed on the outer surfaces of the opposite sides of the upper frame 92.

To mount the bottom power supply board 111, it is inserted into the lower frame 91 through the upper opening of the lower frame 91. As it is pushed inward past the resilient fixation members 913, the fixation members 913 are compressed outward by the edges of the bottom power supply board 111. When the bottom power supply board 111 reaches the bottom of the casing past the fixation members 913, the fixation members 913 will restore their original configurations. Thus, the L-shaped upward steps 917 of the lower ends 916 of the four fixation members 913 resiliently engage the edge of the bottom power supply board 111, thereby securely fixing the bottom power supply board 111 to the lower frame 91. In the event that the bottom power supply board 111 needs to be removed for repair, for example, the bottom power supply board 111 may be pushed against the side walls having the fixation members 913, until the bottom power supply board 111 is released from the fixation members 913. The top power supply board 112 can be mounted on, and dismounted from, the lower frame 91 in the same manner.

Lamp Fixation Structure

First, the lamp fixation structure of the invention will be overviewed.

Figure 30:
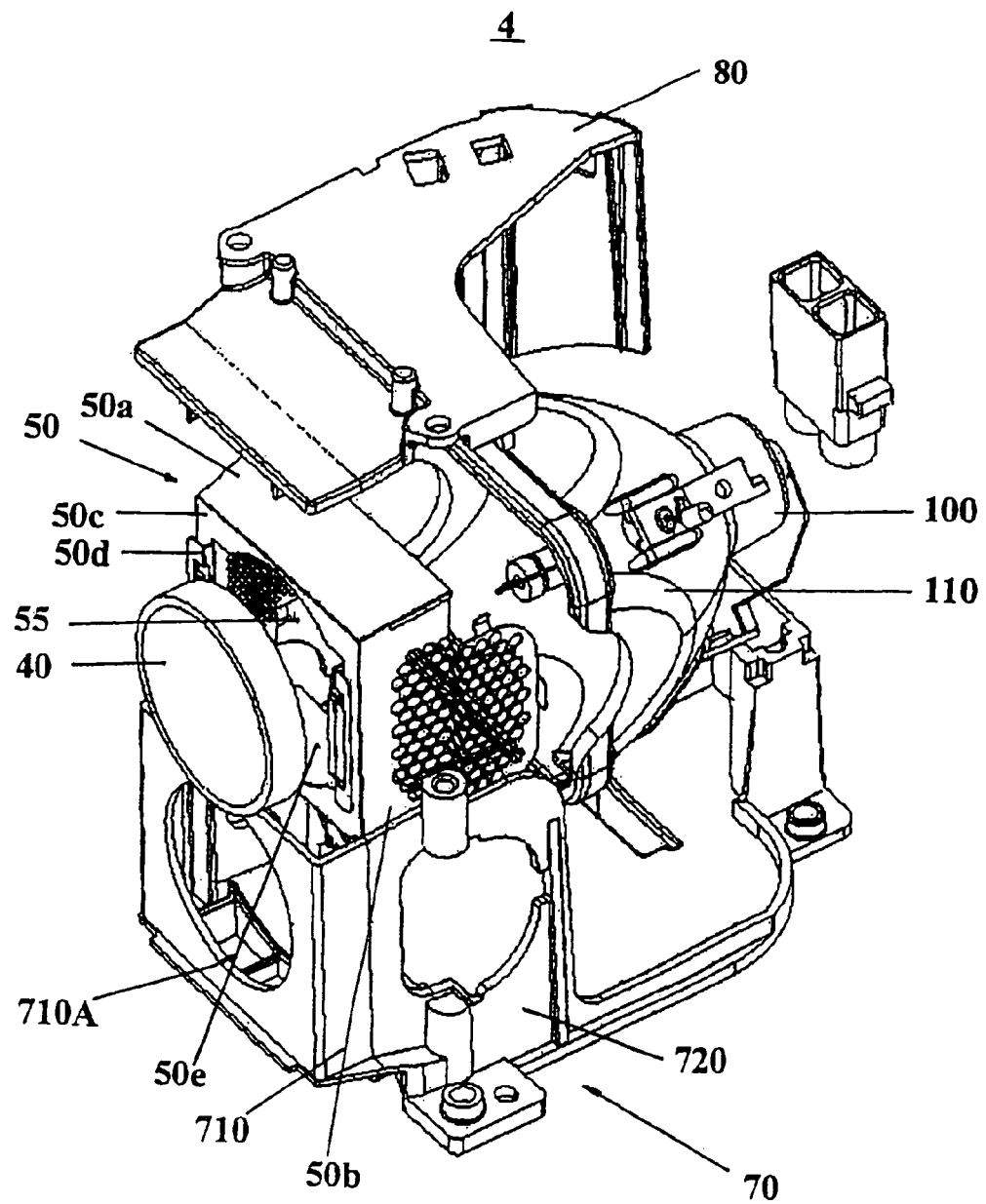
FIG. 30 is an exploded perspective view of a lamp fixation structure for fixing a lamp, showing its various components along with a lamp and a lens.

FIG. 30 is an exploded perspective view of a lamp fixation structure, illustrating how its various components, the lamp 100 of the lamp unit 4, and a lens 40 are assembled together. Referring to FIGS. 30 through 34, the lamp fixation structure has a metal holder 50, a lower holder 70, and an upper holder 80. The lower holder 70 has a lower holder lens section 710 and a lower holder lamp section 720 which are integrally formed. The lower holder lamp section 720 is provided with a lamp fitting slot 720A for fitting therein a lamp. The lower holder lens section 710 is provided with a lens fixing slot 710A for fitting therein a lens. The upper holder 80 is located above the lamp 100 and fixed together with the lower holder 70. The upper holder 80 has a top end section 81 and a lateral section 82. As shown in FIG. 30, the lamp 100 does not have a lamp case but is accommodated in the metal holder 50, which exerts elastic forces on the lamp to firmly hold it in position. As is clearly shown in FIG. 30, the front portion of the lamp case 110 oriented to the lens 40 is fitted in the metal holder 50. The upper holder 80 is located above the metal holder 50 and the lower holder 70, without being fixed to the lower holder 70. FIG. 30 shows the metal holder 50, lamp 100, and lens 40 prior to assembly on the lower holder lamp section 720 and on the lower holder lens section 710.

The lower holder lens section 710 will now be described in detail with reference to FIG. 30 and FIGS. 32 through 34. These figures clearly show details of the lower holder lens section 710.

Figure 32:
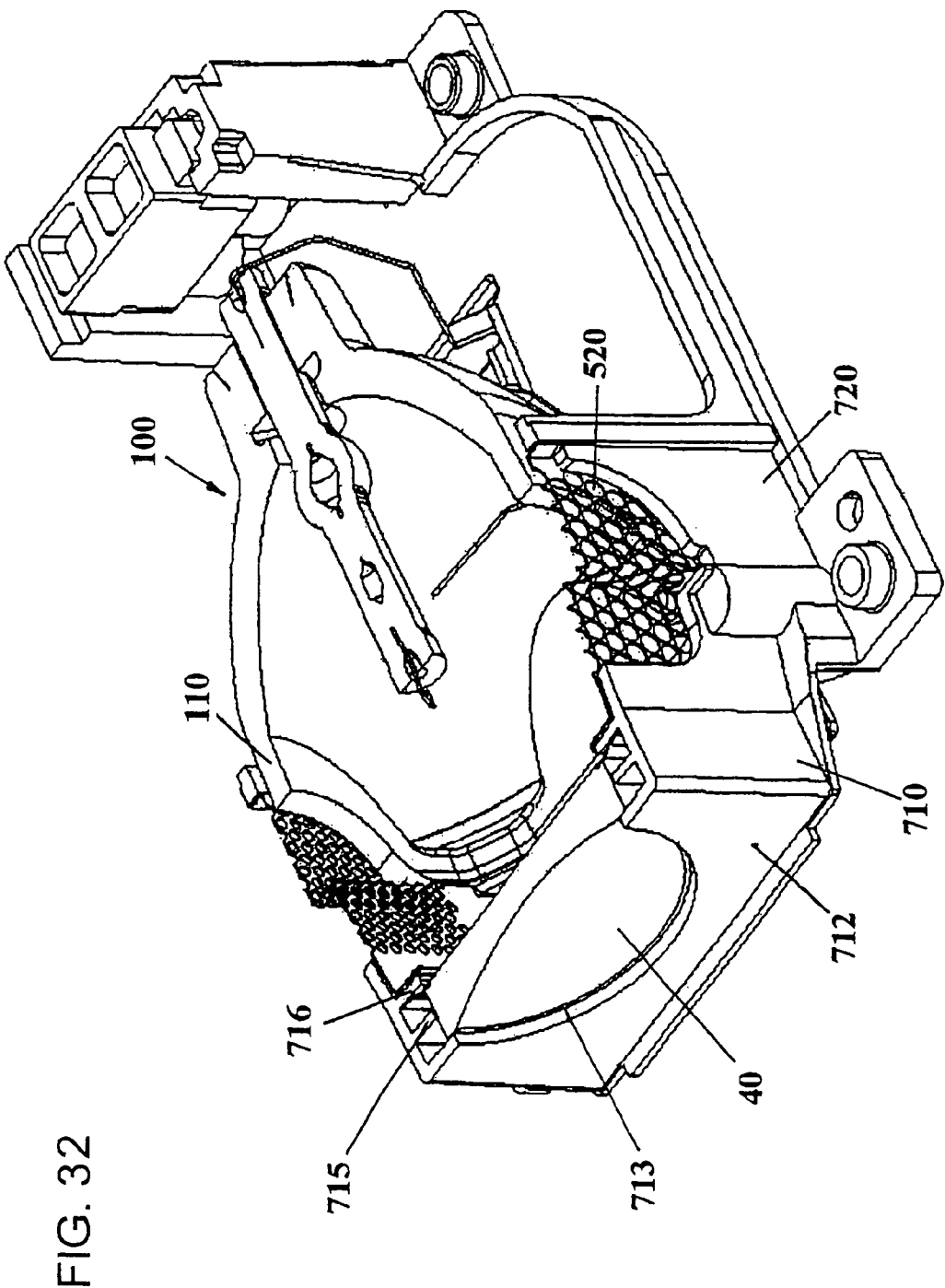
FIG. 32 is a diagram showing a horizontal cross section of the lamp fixation structure.
Figure 33:
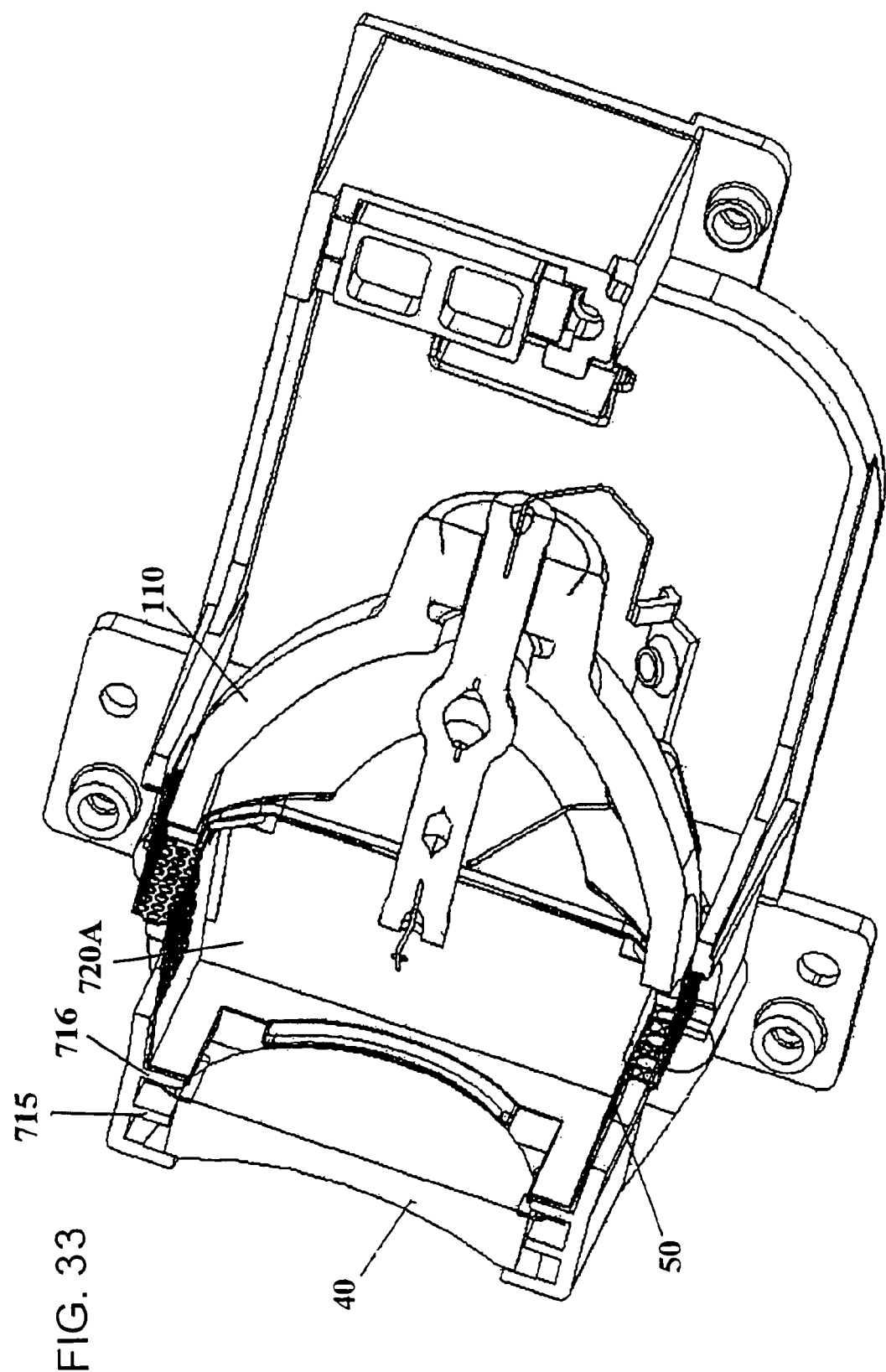
FIG. 33 is another diagram showing a horizontal cross section of the lamp fixation structure as viewed from another angle.
Figure 34:
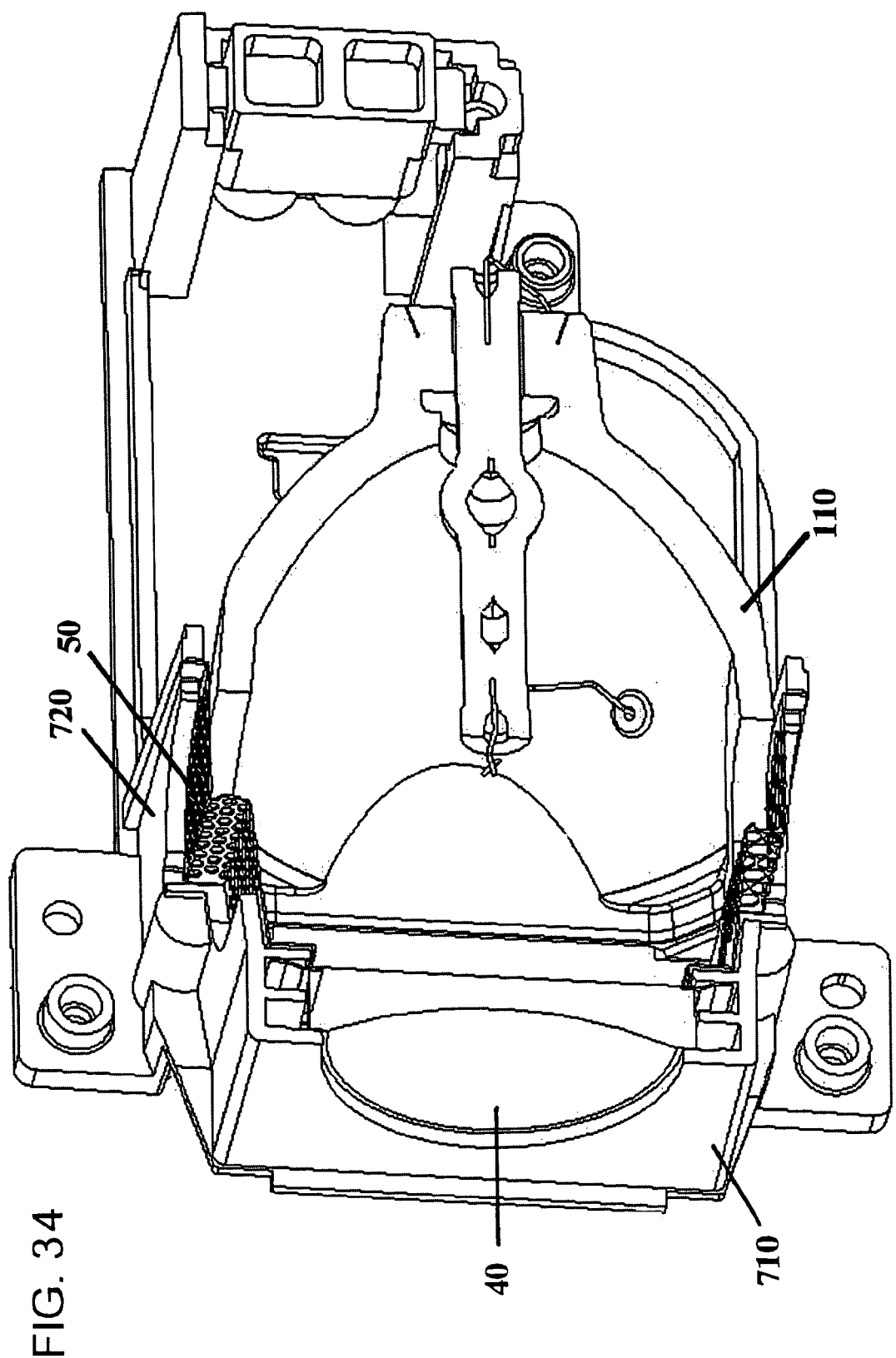
FIG. 34 is a still another diagram showing another horizontal cross section of the lamp fixation structure as viewed from a still another angle.

A lens fixing slot 710A is provided in the lower holder lens section 710, in which slot the lens 40 is fitted in the process of assembly. As shown in FIGS. 32 through 34, each side of the lower holder lens section 710 has at least one thin protrusion 715 adapted to form an annular rim that intimately fits the lens 40. The protrusions 715 can be omitted or replaced by other forms of fixation members for firmly fitting the lens 40 in the lens fixing slot 710A. Each side of the lower holder lens section 710 is further provided with an inwardly protruding rib 716. The rib 716 protrudes further than the protrusions 715 to facilitate fitting the lens 40 in the lens fixing slot 710A in placing the lens 40 in the groove 710A. The protruding rib 716 is useful in assembling the metal holder 50, as described below.

As shown in FIG. 32, an opening 713 facing the lens 40 is formed in the front end 712 of the lower holder lens section 710. Since the lens 40 is substantially circular in shape, so is the opening 713. Obviously, if the lens has a different shape, correspondingly so does the opening 713 also a different shape. Further, the diameter of the opening 713 is smaller than that of the lens 40 so that the lens 40 is firmly fixed by the inner surface of the opening 713, protrusions 715, and protruding rib 716 in the fitting groove 719A.

The lower holder lamp section 720 will now be described below.

Referring to FIGS. 30 and FIG. 32 through 34, the lower holder lamp section 720 and the lower holder lens section 710 are integrally formed. In the most preferred mode of the invention, the lower holder 70 is made of a polymer material (synthetic resin). The lower holder lamp section 720 and the lower holder lens section 710 of the lower holder 70 are integrally formed by pouring a melt plastic into a mold. Alternatively, they can be formed by other processes such as machining, soldering, and welding. The lower holder lamp section 720 is used only as the slot for receiving a lamp as shown. The lower holder 70 is most preferably molded using a resin such as a polyethylene compound, but it can be also fabricated by any other material such as a metal, alloy, and non-organic material.

An opening 722 is formed in each of the opposite side walls facing the lower holder lamp section 720 to send cooling air to the lamp 100. The size, shape, and location of each opening 722 are arbitrary so long as the opening facilitates airing of the lamp 100 while providing the lower holder lamp section 720 with sufficient strength. Obviously, the number of the openings 722 is not limited to two. For example, such opening 722 can be provided in each of the sidewalls.

Figure 31:
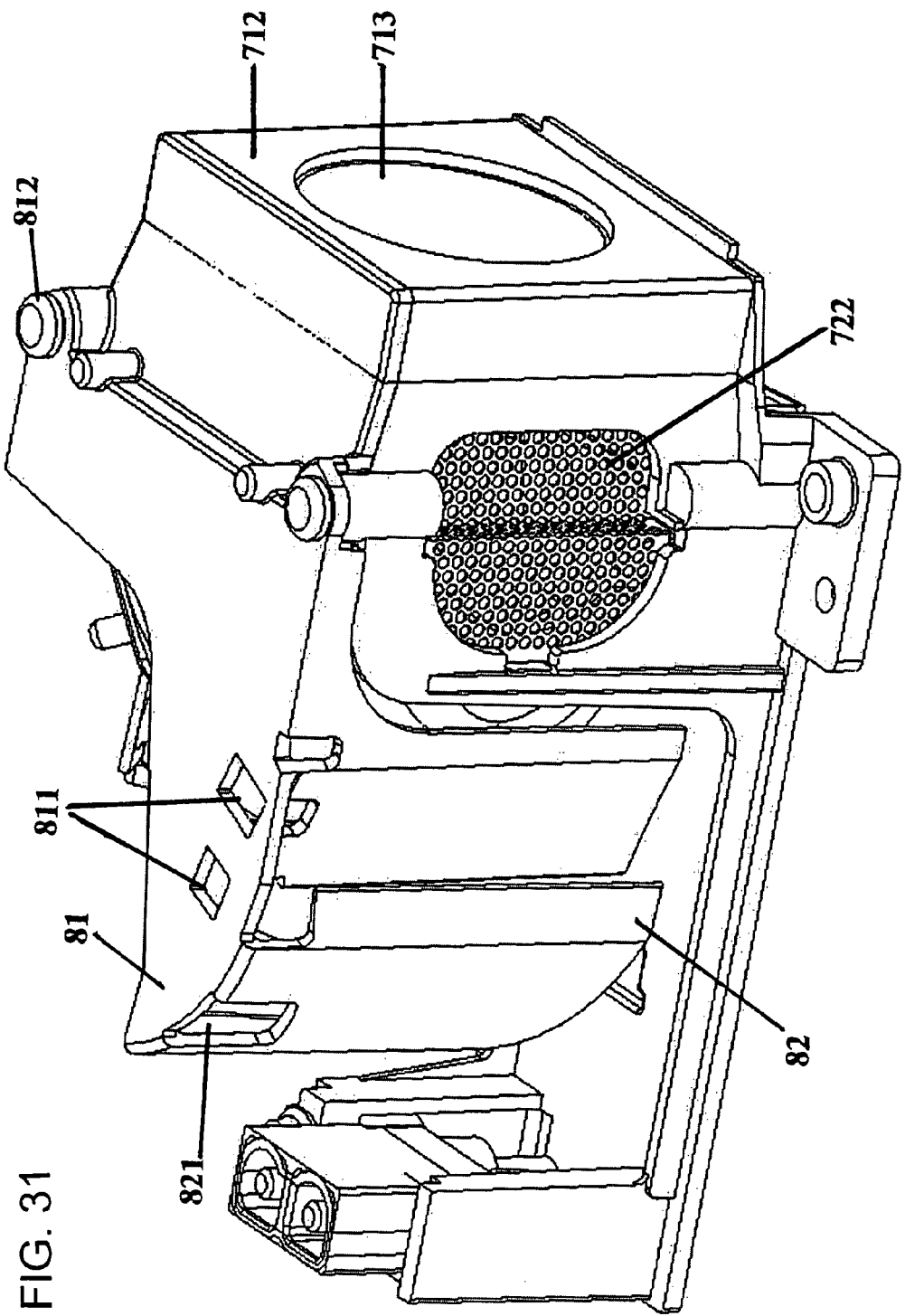
FIG. 31 is another perspective view of the lamp fixation structure as viewed from an angle.

Referring to FIGS. 30 and 31, the upper holder 80 will now be described below.

The upper holder 80 is provided with the top end section 81 and a lateral section 82 covering the lamp 100 as shown. When assembled, the upper holder 80 is jointed to the lower holder 70. The top end section of the upper holder 80 is located above the lamp 100. The lateral section 82 is arranged on one side of the lamp 100. The upper holder 80 is most preferably made of a plastic material. The top end section 81 and the lateral section 82 are integrally formed by molding, but they can be alternatively jointed by other means such as welding. The top end sections have holes 811 and struts 812. The role of the struts 812 is to fasten corresponding portions of the top end section 81 and the lower holder 70 by means of screws or other fixation members. The lateral section 82 is also provided with a multiplicity of holes 821. The holes 811 and 821 are used to fit corresponding portions of the upper protective cover and the top panel 64.

The metal holder 50 of the invention will now be described in detail with reference to FIGS. 30 through 34. Since the lens 40 and the light source have dimensional tolerances, they need to be fixed using resilient metal frames.

FIG. 30 clearly shows the entire metal holder 50. The metal holder 50 is fabricated from a machinable thin sheet metal of, for example, stainless steel, aluminum, and copper or an alloy. The metal holder 50 has an elastic top plate 50a, two facing elastic lateral plates 50b, a front plate 50c, an elastic bottom piece 50e, and two pieces of elastic jointing plate 50d. The front plate 50c is provided with an opening 55 for allowing the light emitted from the lamp 100 to pass through it to the lens 40.

Although the top piece elastic piece 50a, two elastic lateral plates 50b, and the bottom elastic plate 50e are separate pieces, they are integrated with the front plate 50c, advantageously jointed thereto at an angle, e.g. at about a right angle. In this way, an elastic frame for the lamp case 110 is formed. The shape and dimensions of the elastic frame described above should basically match those of the lamp case 110 of the lamp 100. However, the dimensions of the elastic frame are preferably slightly larger than those of the lamp case 110 near the opening of the lamp case 110, but slightly smaller near the front plate 50c. Therefore, as the lamp case 110 of the lamp 100 is inserted into the elastic frame towards the front plate 50c, the four elastic plates 50a, 50b, and 50e are deformed so as to firmly fix the lamp case 110 in position.

Referring to FIG. 30, the two elastic jointing plate 50d are integrally formed on the metal holder 50. They are jointed to the front plate 50c. These elastic jointing metal pieces 50d are simultaneously inserted in the lens fixing slot 710A, and along the ribs 716, together with the metal holder 50 into the lamp fitting slot 710A. Then the elastic jointing plate 50d are slightly deformed, pressed against the lens 40, and in intimate contact with the lens 40.

A multiplicity of venting holes 520 are formed in the two elastic lateral plates 50b of the metal holder 50 such that the venting holes 520 face the opening 722 when assembled. These venting holes 520 allows air that has passed through the opening 722 to further pass through them to the lamp unit 4, thereby facilitating ventilation and heat dissipation of the lamp unit 4. There is no restriction to the number, dimensions, or shapes of the venting holes 520. They can be circular, polygonal, oval, or slit. In one preferred mode of the invention, the venting holes 520 have circular shapes. As is well known to persons skilled in the art, additional vents can be advantageously provided as needed not only in the lamp unit region but also in other regions of, for example, the metal holder 50 for enhanced ventilation and heat dissipation.

As shown in FIG. 30, the metal holder 50 also functions as a shield for blocking light from the light source, in addition to fixing the lens 40 and the light source and effectively venting and cooling them. Thus, the metal holder 50 prevents the upper and lower frames 80 and 70 from being directly heated by light to a high temperature, thereby preventing the light from destroying cooling effect of the ventilation.

The assembly of the lamp fixation structure of the invention will now be described. The lamp fixation structure can be assembled in the following order. First, the lens 40 is inserted in the lens fixing slot 710A of the lower holder 70. Second, the metal holder 50 is forced, along the protruding rib 716 formed on the opposite sides of the lens fixing slot 710A, into the lower holder 70, thereby fringing the elastic jointing plate 50d of the metal holder 50 in the lens fixing slot 710A and in intimate contact with the lens 40 to firmly fix the lens 40 in position. Third, the lamp case 110 for the lamp 100 is inserted in the metal holder 50 and then pushed into the lamp fitting slot 20A of the lower holder 70 together with the metal holder 50. Next, a cover is placed over the upper holder 80. The covered upper holder 80 is then firmly fixed with screws or any other convenient fixation members to the lower frame. Assembly of the lamp fixation structure of the invention is completed in this way.

The lamp fixation structure of the invention has many distinct advantages. For example, the lamp fixation structure of the invention can not only simplify fabrication and assembly thereof but also reduce the fabrication and assembly cost as well as assembly time of the lamp fixation structure. Particularly, integral formation of the metal frame can no only simplify fabrication and assembly of the lamp fixation structure but also reduce the fabrication and assembly cost as well as assembly time, as compared with conventional lamp fixation structures. Further, lamp replacement and the general maintenance of the lamp fixation structure require less time. Still further, the lamp and the lens can be securely fixed in position.

In short, the inventive lamp fixation structure of the projector apparatus consists of a fewer components and can be assembled in a simple manner. Furthermore, it is highly wrought. The components are designed with consideration especially to better fixation of the lamp and the lens. This point is an advantage of the inventive lamp fixation structure over conventional lamp fixation structures.

Light Source Protective Cover

Figure 21:
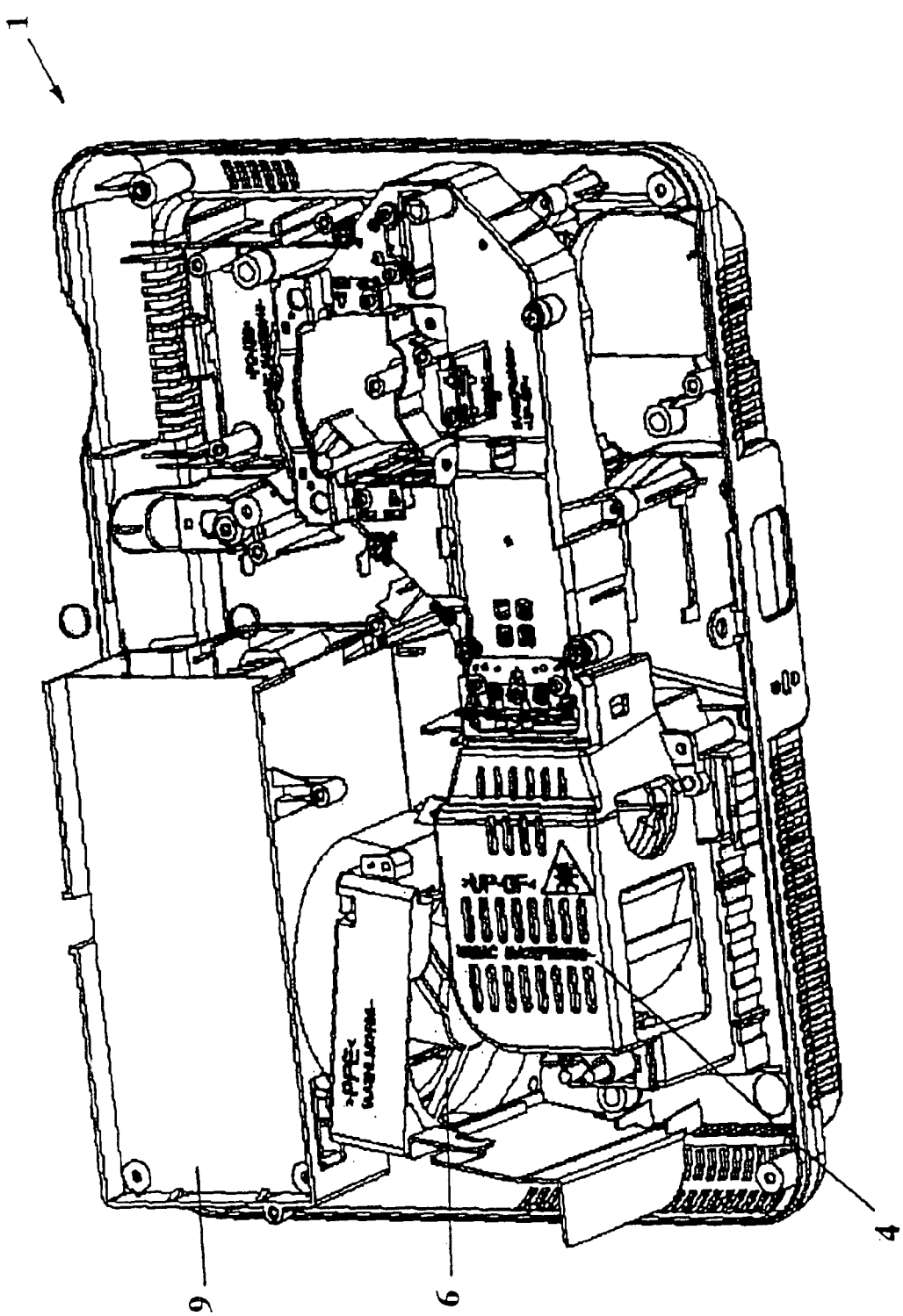
FIG. 21 is a perspective diagram showing the internal structure of the projector apparatus, particularly elements associated with a light source protective cover of the invention.
Figure 22:
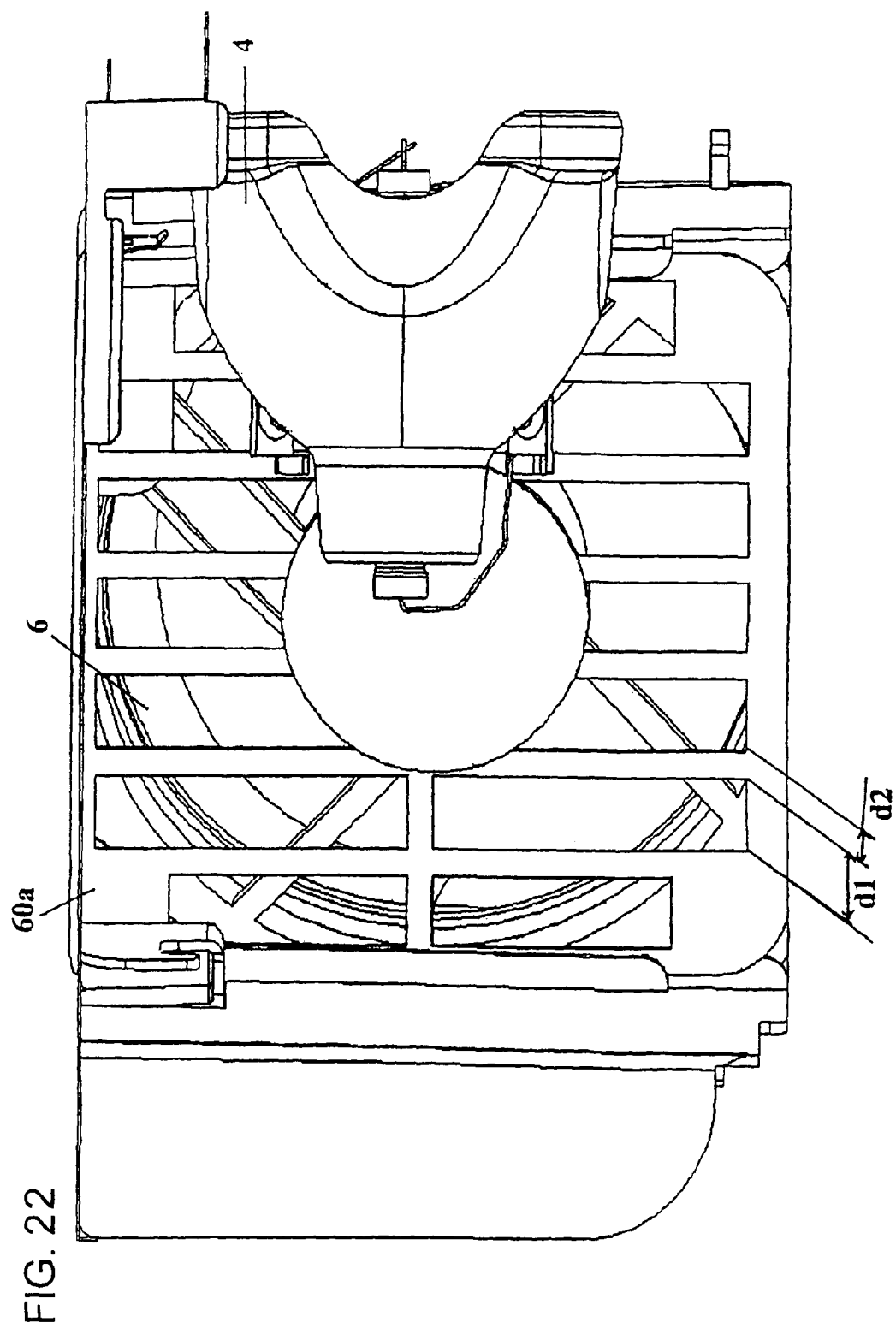
FIG. 22 is a front view of the side panel of the protective cover installed on one side of the light source of the projector apparatus, the figure showing the first fan and the light source located on the opposite sides of the side panel.
Figure 27:
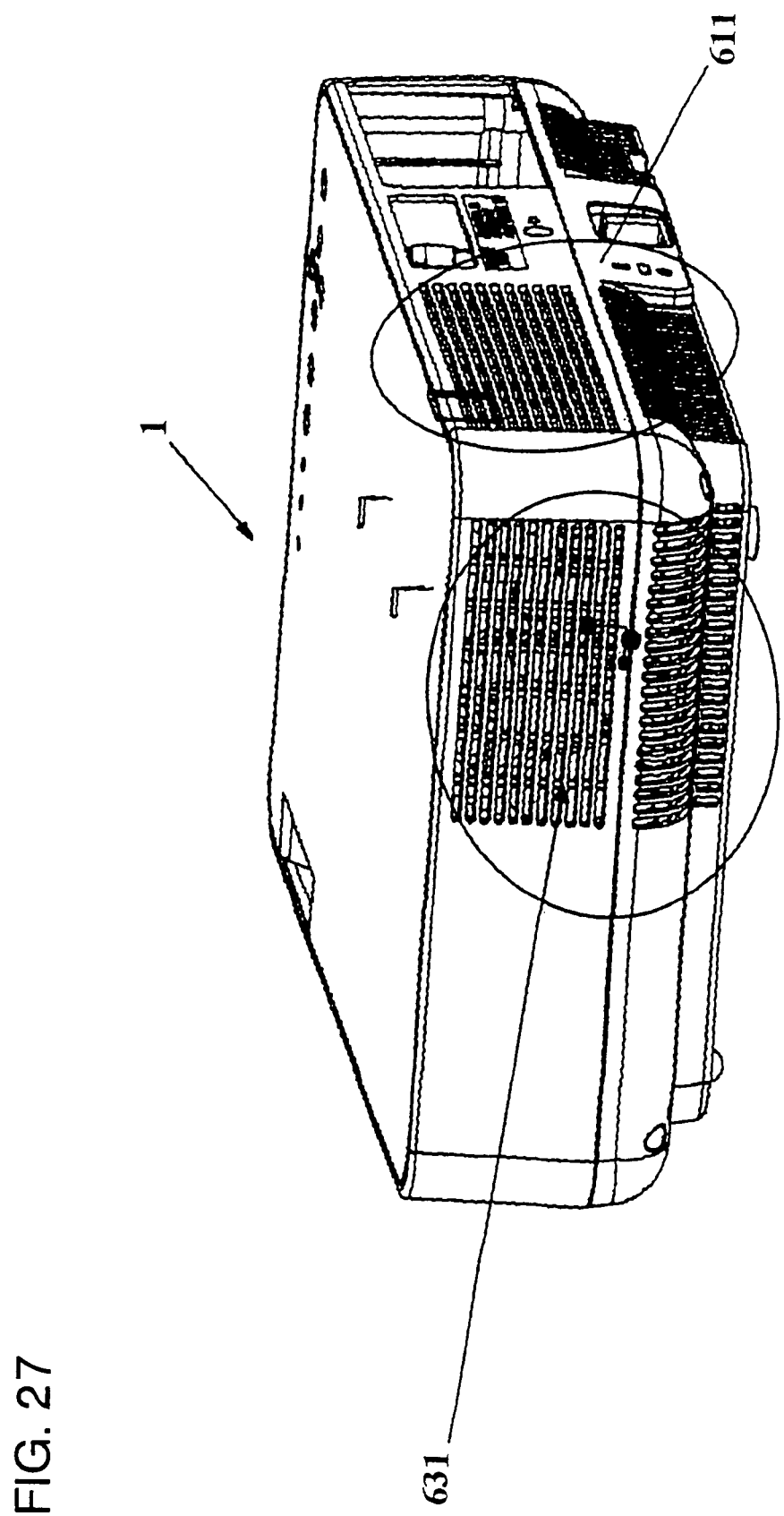
FIG. 27 shows an exhaust associated with the light source of the projector apparatus.
Figure 28:
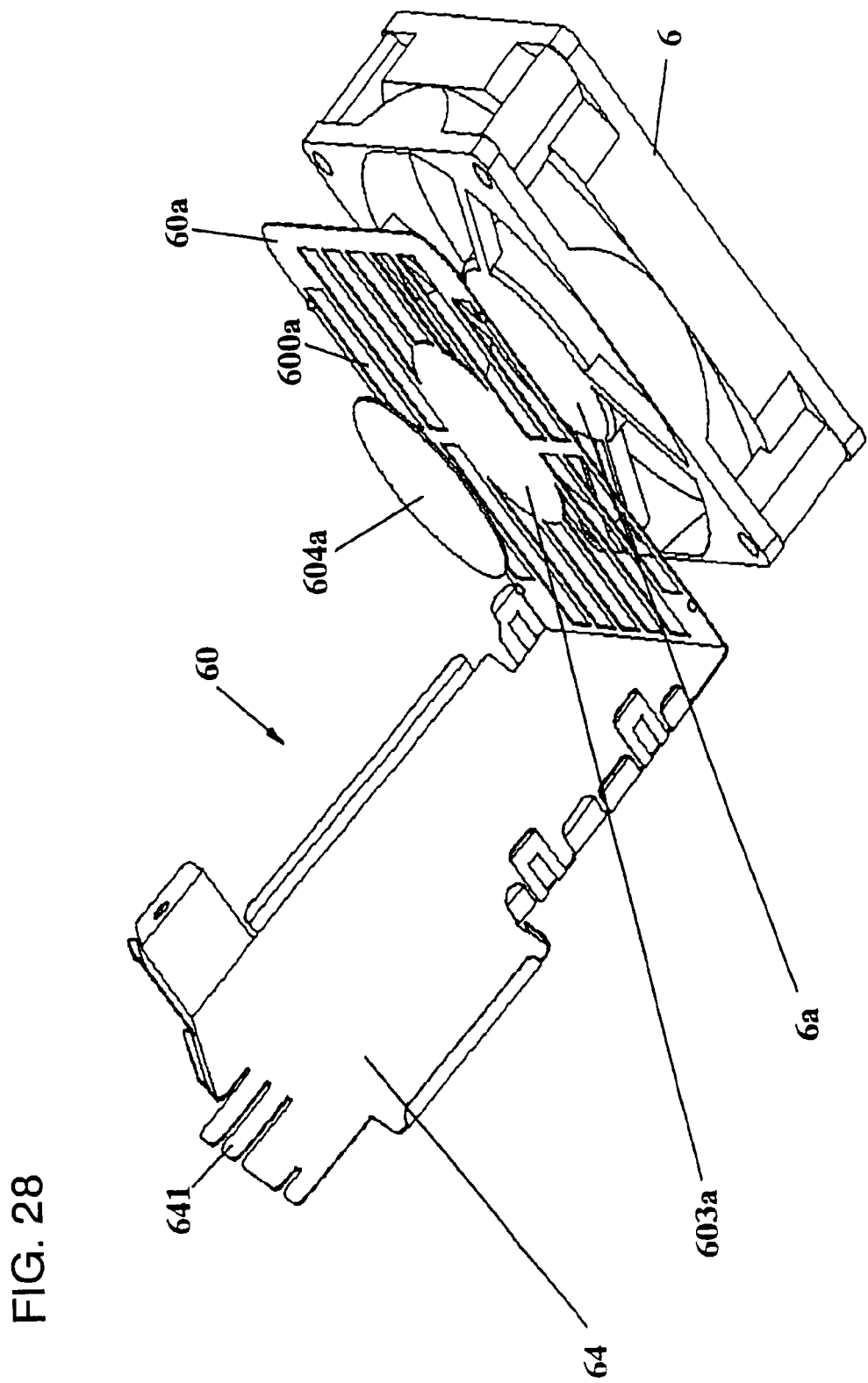
FIG. 28 is an exploded perspective view of the protective cover and the first fan.
Figure 29:
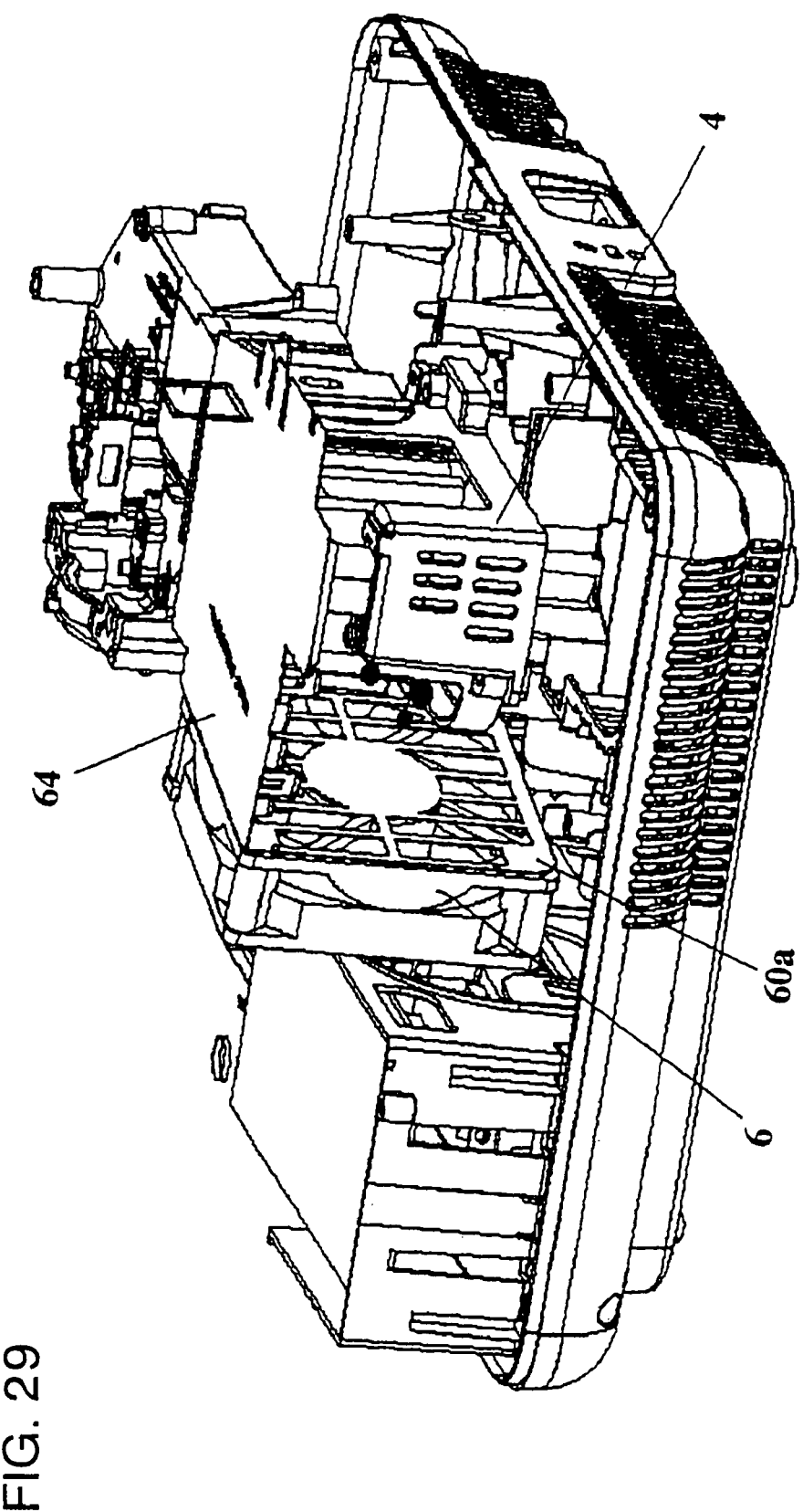
FIG. 29 is an orthographic diagram of the light source protective cover.

Referring to FIG. 21, there is shown the internal structure of the projector apparatus equipped with the power supply unit 9 and the light source 4. To cool the lamp, the first fan 6 first blows air to the power supply unit 9, from where the air is blown into the light source 4, from where the air is exhausted by exhausts 631 and 611, as shown in FIGS. 21 and 27. In order to better cool the light source, the light source 4 is exposed in the exhaust duct for the first fan 6.

Referring to FIGS. 21 through 23, and FIG. 29, the top area and one lateral side of the light source 4 are covered with an L-shaped protective cover 60. The L-shaped protective cover 60 has an integral structure consisting of a lateral panel 60a and a top panel 64. The lateral panel 60a is installed between the light source 4 and the first fan 6. The top panel 64 covers upper end of the light source 4. Preferably, the lateral panel 60a and the top panel 64 are substantially perpendicular to each other, so that the protective cover 60 has a substantially L-shaped transverse cross section.

First, the lateral panel 60a of the protective cover 60 will be described below.

Figure 24:
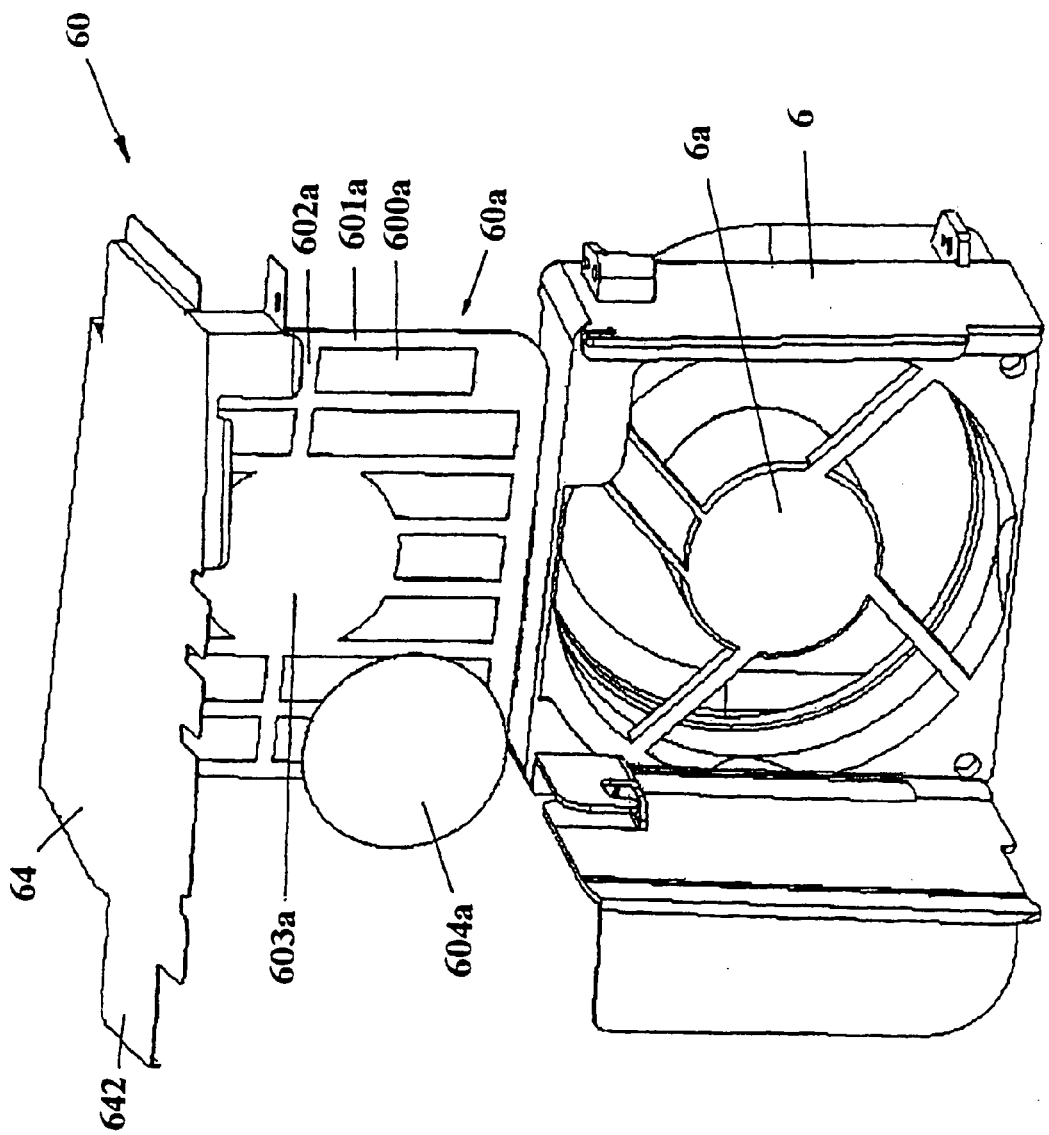
FIG. 24 is an exploded perspective view of the protective cover and the first fan.
Figure 25:
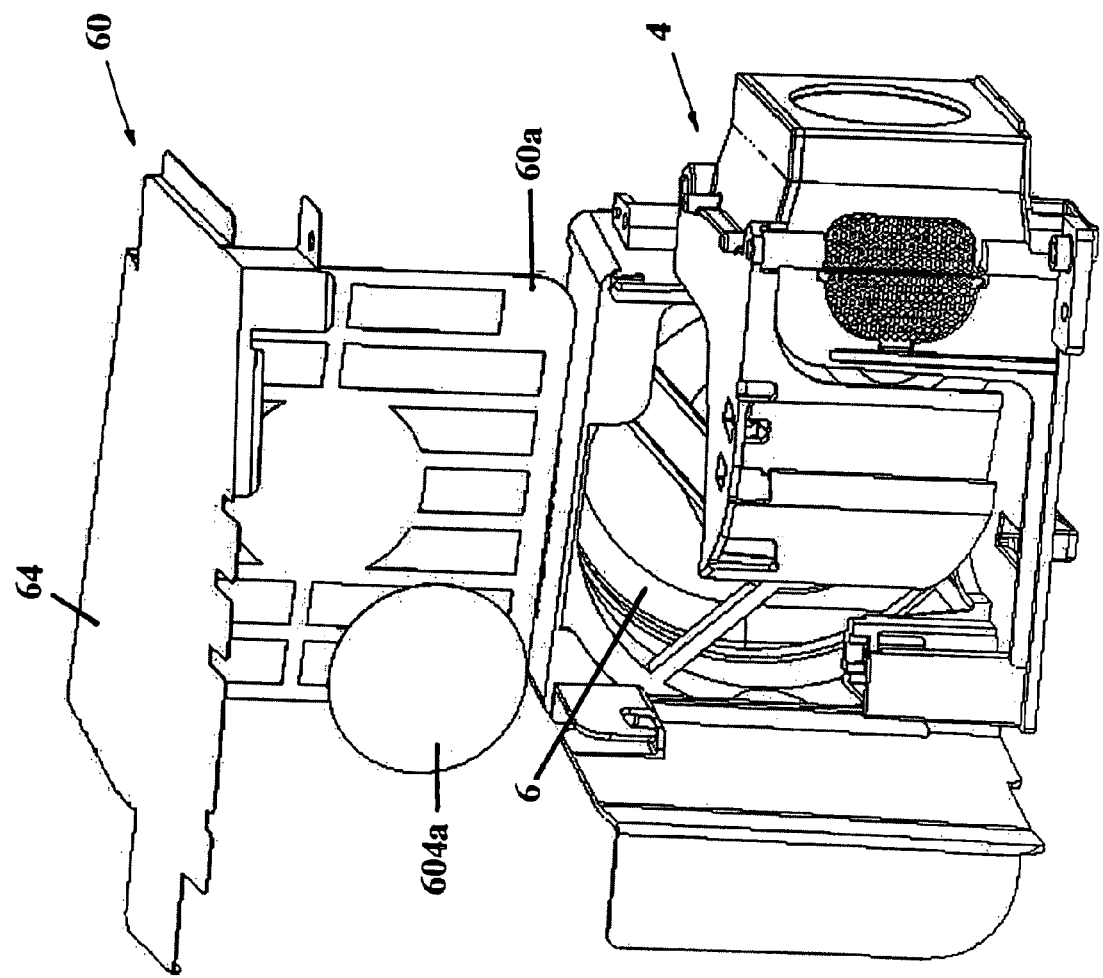
FIG. 25 is an exploded perspective view of the protective cover and the light source.
Figure 26:
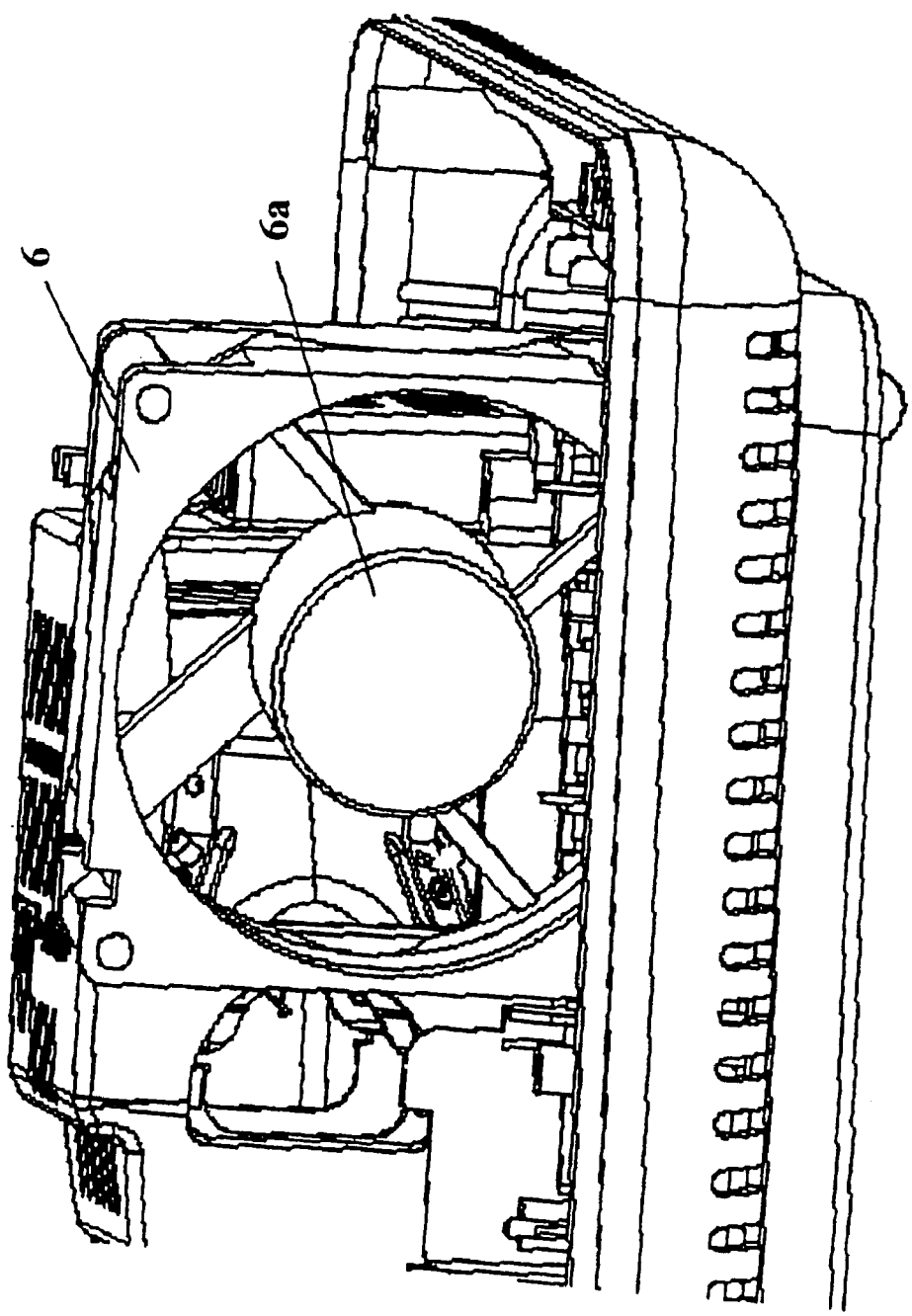
FIG. 26 is a partial projection view of the first fan.

Referring to FIGS. 24 and 25 and FIGS. 28 and 29, details of the arrangement of the protective cover 60, first fan 6, and light source 4 are shown. In operation the light source 4 generates a large amount of light and radiant heat. In order to ensure normal operation of the light source 4, the first fan 6 is oriented such that the air expired therefrom is passed through the exhaust duct for the light source 4. The lateral panel 60a is provided between the first fan 6 and the light source 4, that is, it is installed at a location where light from the light source passes through the duct for the light source 4 if not blocked by the lateral panel 60a. The lateral panel 60a has a multiplicity of vertical openings 600a. As shown in FIG. 24, the openings 600a are separated by vertical strip 601a and the horizontal strips 602a. The lateral panel 60a is formed as a latticed structure. The widths of the openings 600a is sufficiently narrow so that, should a worker who is assembling, disintegrating, or doing maintenance put his finger unintentionally in between the light source 4 and the lateral panel 60a, the finger will not enter the opening 600a and touch the fins of the first fan to get hurt. The width d1 of each opening 600a is usually set in the range from 6 to 8 mm, and most preferably, set to 8 mm. The width d2 of each vertical strip 601a is usually set to 3 mm.

Referring to FIGS. 24 through 26, and FIG. 34, a central light shield 603a is provided at the center of the lateral panel 60a. The central light shield 603a is substantially circular in shape. When assembled, the central light shield 603a faces the first fan 6 to completely blot out the motor 6a of the first fan 6. Mounted on the central light shield 603a is a light shielding piece 604a having the same size and the same shape as the central light shield 603a. The light shielding piece 604a is preferably colored black to absorb light impinging thereon from the light source. One of the purposes of providing the black central light shield 603a is to absorb the light that has leaked from the light source 4 and would otherwise directly impinge on the motor 6a of the first fan, to thereby prevent the motor 6a of the first fan from being heated to an inoperably high temperature by the light. It would be obvious to a person skilled in the art that, to blot out the motor 6a of the first fan, the central light shield 603a can be of any size and any shape. It would be also obvious to a person skilled in the art that the openings 600a can also be of any shape, e.g. circular, polygonal, slit, etc. or elongate in the horizontal direction. The manners of installation of the openings 600a can be also modified. That is, the openings can be arbitrarily modified in shape and/or manner of installation to protect fingers from the openings, so long as the modified openings permit good ventilation by the first fan.

Figure 23:
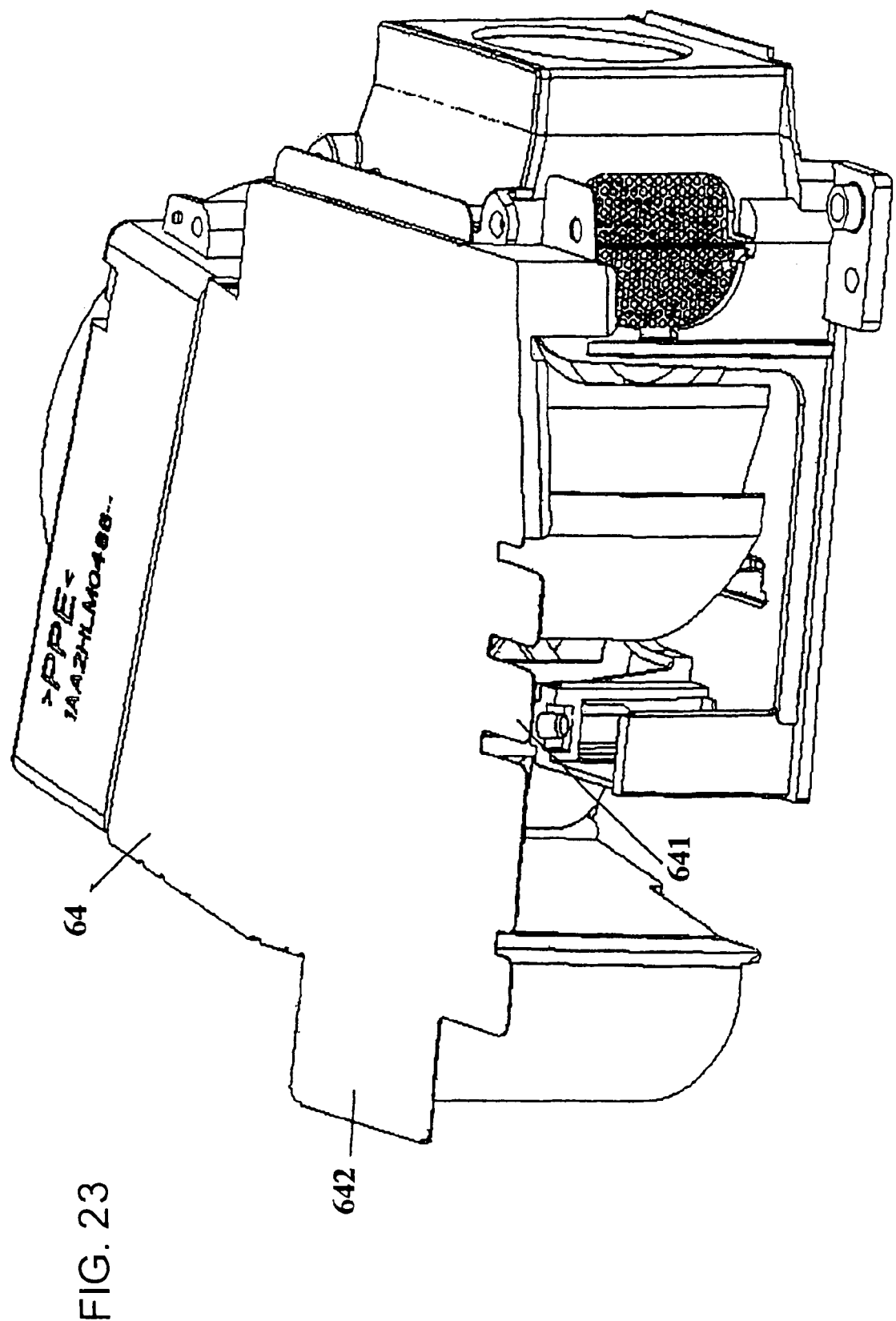
FIG. 23 is a perspective view showing the protective cover and the light source assembled.

The top panel 64 of the protective cover 60 will now be described below. Referring to FIGS. 23 though 25, details of the top panel 64 of the protective cover 60 are shown.

The top panel 64 is installed above the upper end of the light source 4. The top panel 64 has ribs 641 and 642, which are jointed to surrounding structures to firmly fix the top panel 64 in position. One of the purposes to provide the top panel 64 is to shield light that has leaked from the light source 4 and directly impinges on the exterior of the projector apparatus. Further, since the top panel 64 is metallic, it is capable of shielding ambient electromagnetic radiation. Thus, the projector apparatus of the invention complies with the EMC regulations.

The top panel 64 and the lateral panel 60a of the protective cover 60 are preferably integrally formed from a sheet metal using a press machine. Thus, not only the fabrication but also assembly of the protective cover 60 is achieved in a simple manner with a reduced manufacturing cost. Of course, the top panel 64 and the lateral panel 60a can be formed as independent parts that can be jointed or assembled later to form the protective cover 60. The protective cover is typically manufactured from a sheet metal of, e.g. steel, aluminum, stainless steel, or alloy, but it may be manufactured from other materials including heat-resistive polymers and non-organic materials covered with a heat-conductive and radiation-shielding metal layer formed by electroplating, chemical plating, brushing, etc.

By applying the invention, it is possible to protect relevant components such as a motor of a first fan from light that has leaked from the light source, and at the same time establish an open cooling system, thereby preventing the relevant components from being heated to a high temperature. In this way, the invention can provide durable and cost effective exhaust fans, avoiding use of expensive high-temperature-tolerant exhaust fans.

Based on the description above, a person skilled in the art can provide a protective cover 60 capable of effectively shielding and absorbing light (or heat) radiated from the light source 4 and dissipating the heat, thereby providing a projection apparatus that complies with the EMC regulations.

What we claim is:

1. A projector apparatus adapted to construct imaging light in response to the light received form a light source and project the imaging light onto a front screen, said projector apparatus equipped with a lamp fixation structure for fixing a lamp serving as the light source that includes:

a lower holder having
- a lower holder lens section having a front opening, and a lens fixing slot and a protrusion for firmly fixing a lens, said front opening has a diameter smaller than that of said lens, and
- a lower holder lamp section defining a lamp fitting slot for fixing a lamp, said lower holder lamp section formed integral with said lower holder lens section;

an upper holder connected to said lower holder; and an integrally formed metal holder for fixing said lens and lamp.

2. The projector apparatus according to claim 1, wherein said metal holder has an elastic top plate, elastic lateral plates, a front plate, an elastic bottom plate, and elastic joint plates.

3. The projector apparatus according to claim 1, wherein said lower holder lamp section has openings in the opposite side walls thereof.

4. The projector apparatus according to claim 2, wherein each of said elastic top plate and lateral section has at least one opening.

5. The projector apparatus according to claim 1, wherein said metal holder is made of steel.

6. The projector apparatus according to claim 2, wherein each of said elastic lateral plates of said metal holder has multiple venting holes.

7. The projector apparatus according to any one of claims 1-6, wherein said lower holder lamp section and lower holder lens section are integrally formed by molding a polymer material.

* * * * *